US012747946B2

(12) United States Patent
Falorni et al.

(10) Patent No.: US 12,747,946 B2
(45) Date of Patent: Sep. 29, 2026

(54) MEMS GYROSCOPE WITH ENHANCED ROBUSTNESS AGAINST VIBRATIONS AND REDUCED DIMENSIONS

(71) Applicant: STMICROELECTRONICS S.r.l., Agrate Brianza (IT)

(72) Inventors: Luca Giuseppe Falorni, Limbiate (IT); Patrick Fedeli, Senago (IT); Gabriele Gattere, Castronno (IT); Carlo Valzasina, Gessate (IT); Paola Carulli, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 452 days.

(21) Appl. No.: 18/339,084

(22) Filed: Jun. 21, 2023

(65) Prior Publication Data

US 2024/0003685 A1 Jan. 4, 2024

(30) Foreign Application Priority Data

Jul. 1, 2022 (IT) ........................ 102022000014050

(51) Int. Cl.

| | |
|---|---|
| ***G01C 19/5733*** | (2012.01) |
| ***G01C 19/5712*** | (2012.01) |
| ***G01C 19/5769*** | (2012.01) |

(52) U.S. Cl.

CPC ..... *G01C 19/5733* (2013.01); *G01C 19/5712* (2013.01); *G01C 19/5769* (2013.01)

(58) Field of Classification Search

None

See application file for complete search history.

(56) References Cited

U.S. PATENT DOCUMENTS 8,234,920 B2 * 8/2012 Higuchi ............. G01C 19/5719 73/504.12
8,375,787 B2 * 2/2013 Sattler .................. G01C 19/574 73/504.12

(Continued)

FOREIGN PATENT DOCUMENTS

DE 102007030119 A1 1/2009
WO WO 02066929 A1 8/2002

OTHER PUBLICATIONS

Sharma et al., "A 104-dB Dynamic Range Transimpedance-Based CMOS ASIC for Tuning Fork Microgyroscopes," *IEEE Journal of Solid-State Circuits* 42(8): 1790-1802, Aug. 2007.

(Continued)

*Primary Examiner* — Mark A Shabman

(74) *Attorney, Agent, or Firm* — Seed Intellectual Property Law Group LLP

(57) ABSTRACT

MEMS gyroscope, having a first movable mass configured to move with respect to a fixed structure along a first drive direction and along a first sense direction, transverse to the first drive direction; a first drive assembly, coupled to the first movable mass and configured to generate a first alternate drive movement; a first drive elastic structure, coupled to the first movable mass and to the first drive assembly, rigid in the first drive direction and compliant in the first sense direction; a second movable mass, configured to move with respect to the fixed structure in a second drive direction parallel to the first drive direction and in a second sense direction parallel to the first sense direction; a second drive assembly, coupled to the second movable mass and configured to generate a second alternate drive movement in the second drive direction; and a second drive elastic structure, coupled to the second movable mass and to the second drive (Continued)

assembly, rigid in the second drive direction and compliant in the second sense direction.

13 Claims, 23 Drawing Sheets

(56) References Cited

U.S. PATENT DOCUMENTS

| | | | | |
|---|---|---|---|---|
| 9,273,962 | B2 * | 3/2016 | Kanemoto | G01C 19/5733 |
| 9,372,084 | B2 * | 6/2016 | Furuhata | G01C 19/56 |
| 9,476,897 | B2 * | 10/2016 | Jomori | G01P 1/026 |
| 9,857,174 | B2 * | 1/2018 | Furuhata | G01C 19/574 |
| 10,627,235 | B2 * | 4/2020 | Prikhodko | G01C 19/5747 |
| 10,697,774 | B2 * | 6/2020 | Prikhodko | G01C 19/574 |
| 11,193,771 | B1 * | 12/2021 | Gregory | G01C 19/5712 |
| 2003/0154788 | A1 * | 8/2003 | Willig | G01C 19/5747 73/504.02 |
| 2012/0247206 | A1 * | 10/2012 | Ohms | G01C 19/5747 73/504.12 |
| 2013/0192365 | A1 * | 8/2013 | Zhuang | G01C 19/5733 73/504.12 |
| 2016/0363445 | A1 * | 12/2016 | Anac | G01P 15/0802 |
| 2018/0283867 | A1 * | 10/2018 | Ruohio | G01C 19/5747 |

OTHER PUBLICATIONS

Tatar et al., "Quadrature-Error Compensation and Corresponding Effects on the Performance of Fully Decoupled MEMS Gyroscopes," *Journal of Microelectromechanical Systems* 21(3):656-667, Jun. 2012.

* cited by examiner

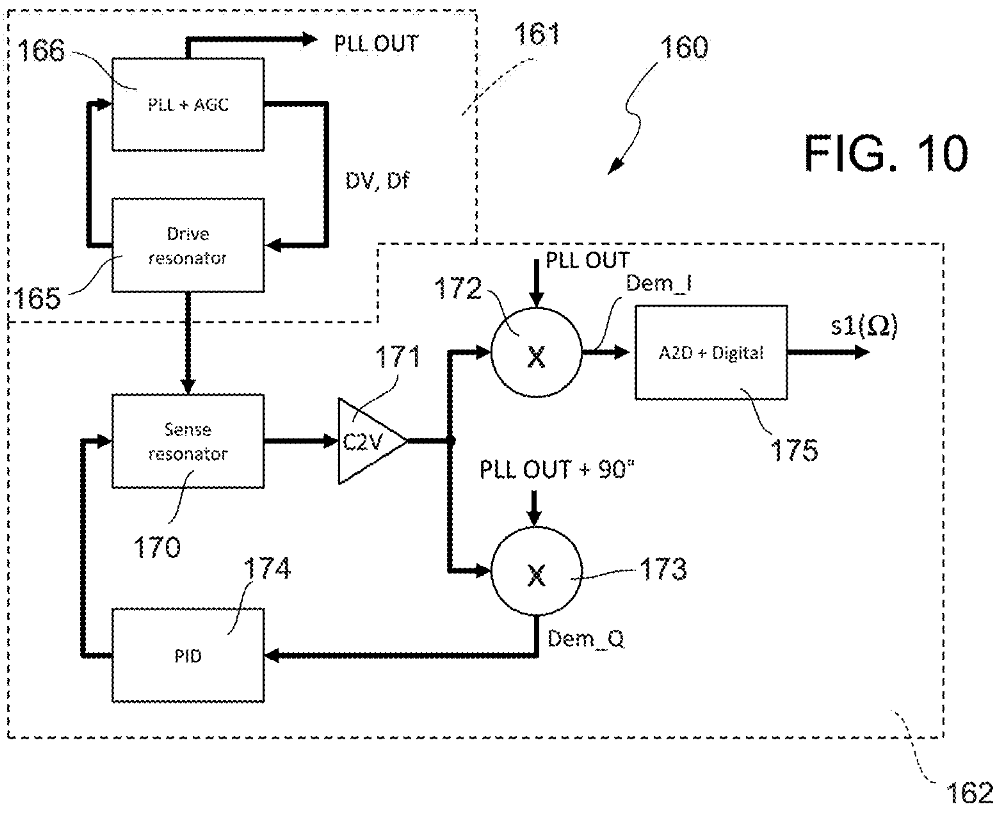
FIG. 10
FIG. 11
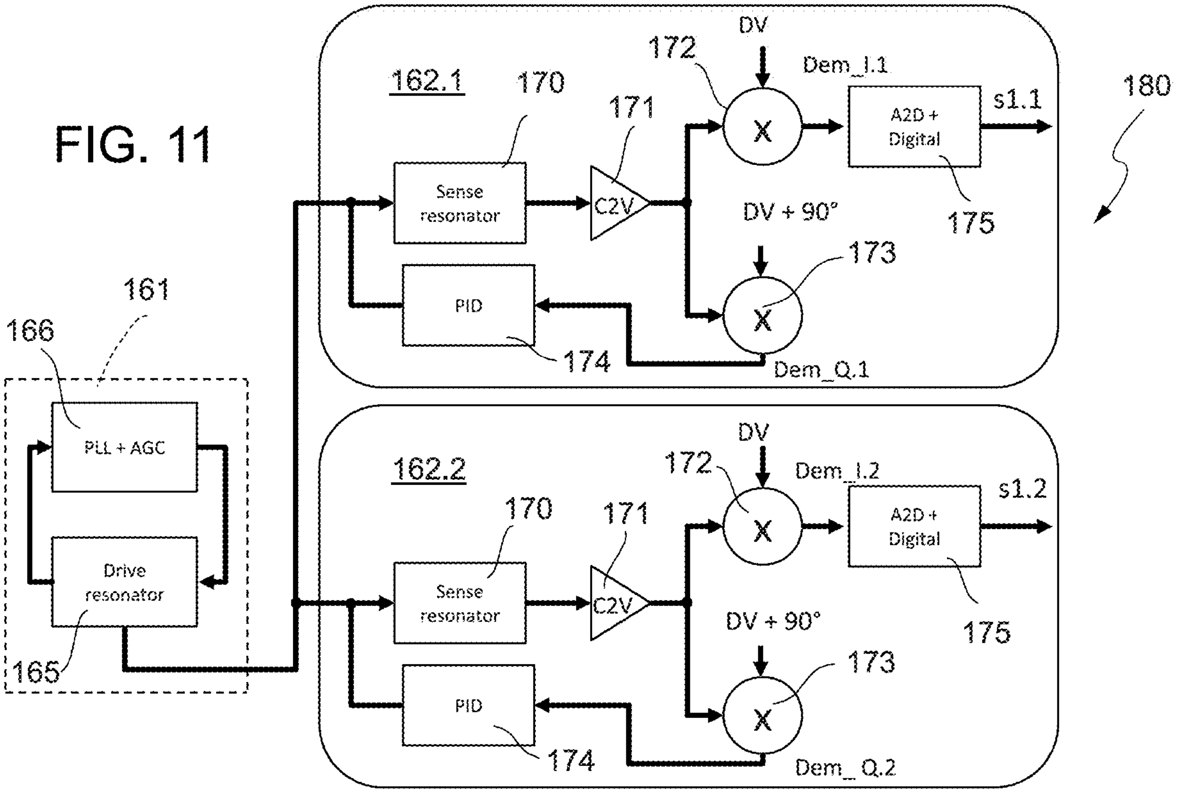

MEMS GYROSCOPE WITH ENHANCED ROBUSTNESS AGAINST VIBRATIONS AND REDUCED DIMENSIONS

BACKGROUND

Technical Field

The present disclosure relates to a MEMS gyroscope with enhanced robustness against vibrations and reduced dimensions.

Description of the Related Art

A gyroscope made using MEMS ("Micro Electro-Mechanical Systems") technology is formed in a die of semiconductor material, for example silicon, and comprises at least one movable mass suspended on a substrate and free to oscillate with respect to the substrate with one or more degrees of freedom.

The movable mass is generally coupled to a drive structure which causes an oscillation of the movable mass along a drive direction, and is coupled to the substrate by detection electrodes capable of detecting a displacement of the movable mass along a sense direction.

When the MEMS gyroscope rotates with an angular speed around a rotation axis perpendicular to the drive direction, the movable mass is subject to a Coriolis force directed along the sense direction, perpendicular to the rotation axis and to the drive direction. The measurement of the displacement of the movable mass therefore allows sensing of the external angular speed.

Current MEMS gyroscopes are of uniaxial, biaxial or triaxial type, configured to sense movement along one, two or three axes.

In all cases, they are generally sensitive to vibrations that are directed parallel to the sense and/or drive axis or axes and may cause spurious displacements and therefore generation of spurious signals. Such spurious signals are unwanted, as they cause a noise, and may affect the stability of the gyroscope.

In general, in fact, a sensor (specifically, a gyroscope) is considered stable when the output signal only depends on the quantity to be sensed, here the external rate.

In particular, for gyroscopes usable in the automotive field, it is desired that they are resistant to vibrations up to several tens of kHz ("robustness to vibrations").

To increase the sensing robustness, it is common to use multiple redundant structures, so as to make the device less sensitive to external vibrations.

However, doubling or even completely multiplying the gyroscope structure entails a very large size and does not always solve the problem.

BRIEF SUMMARY

Various embodiments of the present disclosure provide a gyroscope which has a high robustness against vibrations, with reduced size.

According to the present disclosure, a MEMS gyroscope is provided. The MEMS gyroscope includes a first movable mass configured to move with respect to a fixed structure along a first drive direction and along a first sense direction, transverse to the first drive direction; a first drive assembly, coupled to the first movable mass and configured to generate a first alternate drive movement; a first drive elastic structure, coupled to the first movable mass and to the first drive assembly, rigid in the first drive direction and compliant in the first sense direction; a second movable mass, configured to move with respect to the fixed structure in a second drive direction parallel to the first drive direction and in a second sense direction parallel to the first sense direction; a second drive assembly, coupled to the second movable mass and configured to generate a second alternate drive movement in the second drive direction; and a second drive elastic structure, coupled to the second movable mass and to the second drive assembly, rigid in the second drive direction and compliant in the second sense direction

BRIEF DESCRIPTION OF THE SEVERAL VIEWS OF THE DRAWINGS

For a better understanding of the present disclosure, embodiments thereof are now described, purely by way of non-limiting example, with reference to the attached drawings, wherein:

FIG. 10 shows a block diagram of a system for controlling the parameters of a gyroscope;

FIG. 11 shows a block diagram of another system for controlling the parameters of a gyroscope;

DETAILED DESCRIPTION

The following description refers to the arrangement as shown; consequently, expressions such as “above”, “below”, “top”, “bottom”, “right”, “left”, “high”, “low”, “clockwise”, “counterclockwise” relate to the attached Figures and are not to be intended in a limiting manner.

Figure 1:
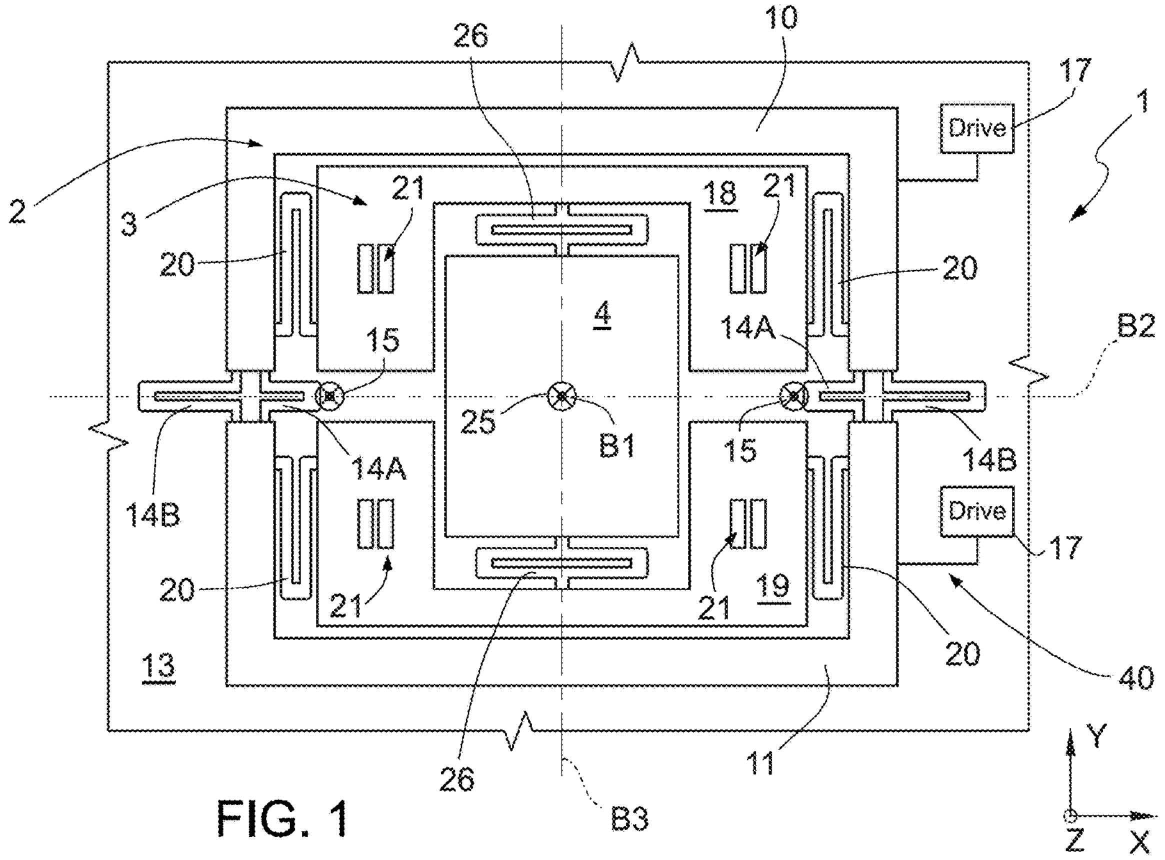
FIG. 1 is a schematic top view of an elementary structure of a MEMS gyroscope in rest condition.

FIG. 1 shows a gyroscope 1 made using MEMS technology and having a substantially planar structure, with main extension in a horizontal plane XY of an inertial reference system XYZ.

The gyroscope 1 is of a uniaxial type, for sensing yaw, that is rotations of the gyroscope 1 around an axis perpendicular to the horizontal plane XY (vertical axis Z of the inertial reference system XYZ).

The gyroscope 1 of FIG. 1 comprises a gyroscope unit 40 having a first barycentric axis B1, parallel to the vertical axis Z, a second barycentric axis B2, parallel to a first horizontal axis X, and a third barycentric axis B3, parallel to a second horizontal axis Y of the inertial reference system XYZ.

The gyroscope 1 substantially has a three-level architecture, symmetrical with respect to the second and the third barycentric axes B2, B3 and including a drive structure 2; a Coriolis structure 3 and a sense mass 4.

The drive structure 2, the Coriolis structure 3 and the sense mass 4 extend mainly in the plane XY (along the first and the second horizontal axes X, Y) and have a thickness (measured parallel to the vertical axis Z) negligible with respect to other dimensions.

The drive structure 2 comprises two frames 10, 11 (hereinafter also referred to as first and second frame 10, 11, in order to distinguish them), here approximately C-shaped, arranged with the respective concavities facing each other, symmetrically to the second barycentric axis B2.

The frames 10, 11 are coupled to a support 13 (for example a substrate of a semiconductor die forming part of a fixed structure) through first springs 14A; the first and the second frames 10, 11 are also elastically coupled to each other through frame coupling springs 14B. The first springs 14A and the frame coupling springs 14B allow the suspension of the frames 10, 11 on the support 13 (through a respective anchoring point 15) and allow the frames 10, 11 to move (drive movement) in one drive direction, here parallel to the second horizontal axis Y.

Figure 2:
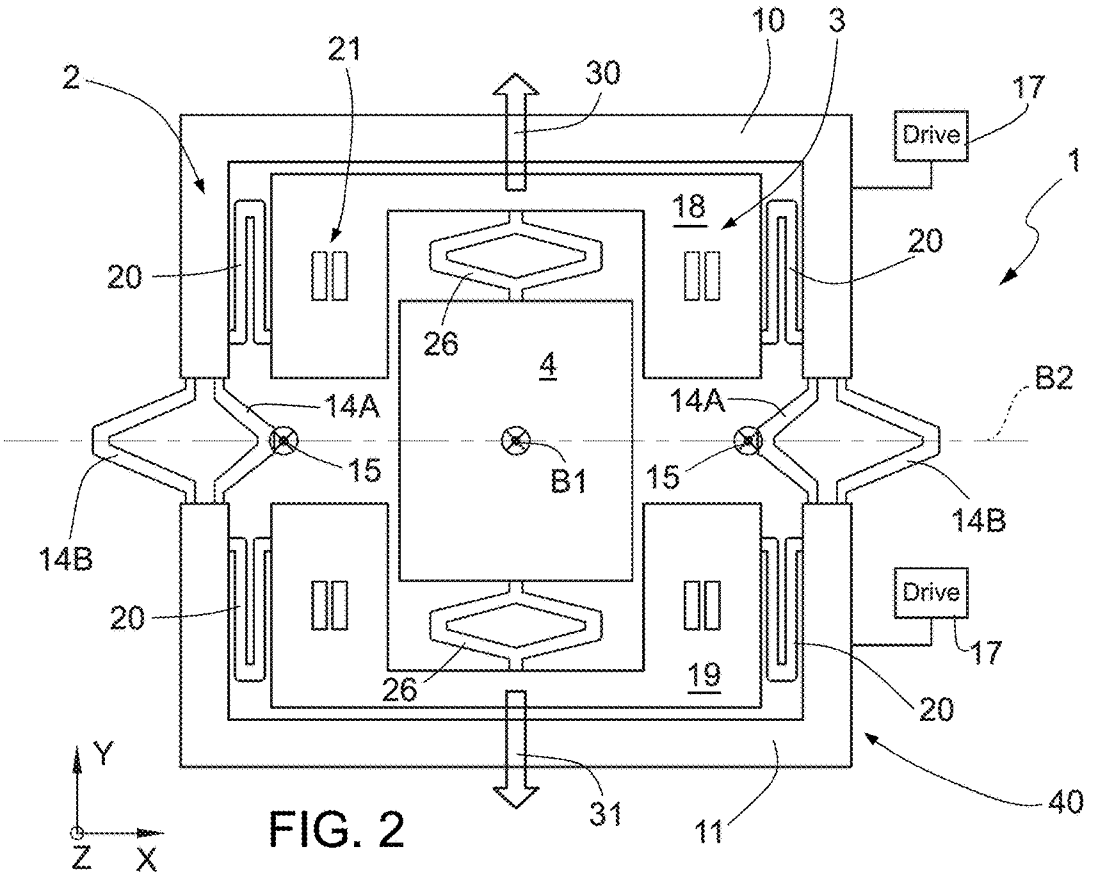
FIG. 2 is a schematic top view of the elementary structure of FIG. 1, in drive mode.

Actuation assemblies (shown schematically at 17 in FIGS. 1-4 and shown for example in FIG. 6), for example of capacitive electrostatic type, are coupled to the frames 10, 11 to control the drive movement of the frames 10, 11 in a drive direction, in phase opposition to each other, as indicated in FIG. 2 by arrows 30, 31 and as described in more detail below. For example, the actuation assemblies 17 are coupled between each frame 10, 11 and the support 13.

The Coriolis structure 3 comprises two Coriolis masses 18, 19, here also approximately C-shaped and arranged, symmetrically to the second and the third barycentric axes B2, B3, inside the concavities of the frames 10, 11, with the respective concavities facing each other. In other words, here, each Coriolis mass 18, 19 is surrounded on three sides by a respective frame 10, 11.

Furthermore, in FIG. 1, each Coriolis mass 18, 19 is formed by three sides arranged at right angles with respect to those adjacent, parallel to corresponding sides of the respective frame 10, 11.

Each Coriolis mass 18, 19 is coupled to a respective frame 10, 11 through second springs 20 which allow a mutual movement between the frames 10, 11 and the respective Coriolis mass 18, 19 in a direction parallel to the second horizontal axis Y (sense movement).

The sense mass 4 here extends inside both concavities of the Coriolis masses 18, 19. In FIG. 1, the sense mass has a generally quadrilateral shape, with sides parallel to the sides of the Coriolis masses 18, 19 and of the frames 10, 11.

The sense mass 4 is anchored to the support 13 here in central position through a sense elastic anchoring system 25 (shown schematically) which allows the rotation of the sense mass 4 around a rotation axis (here, the first barycentric axis B1).

Figure 3:
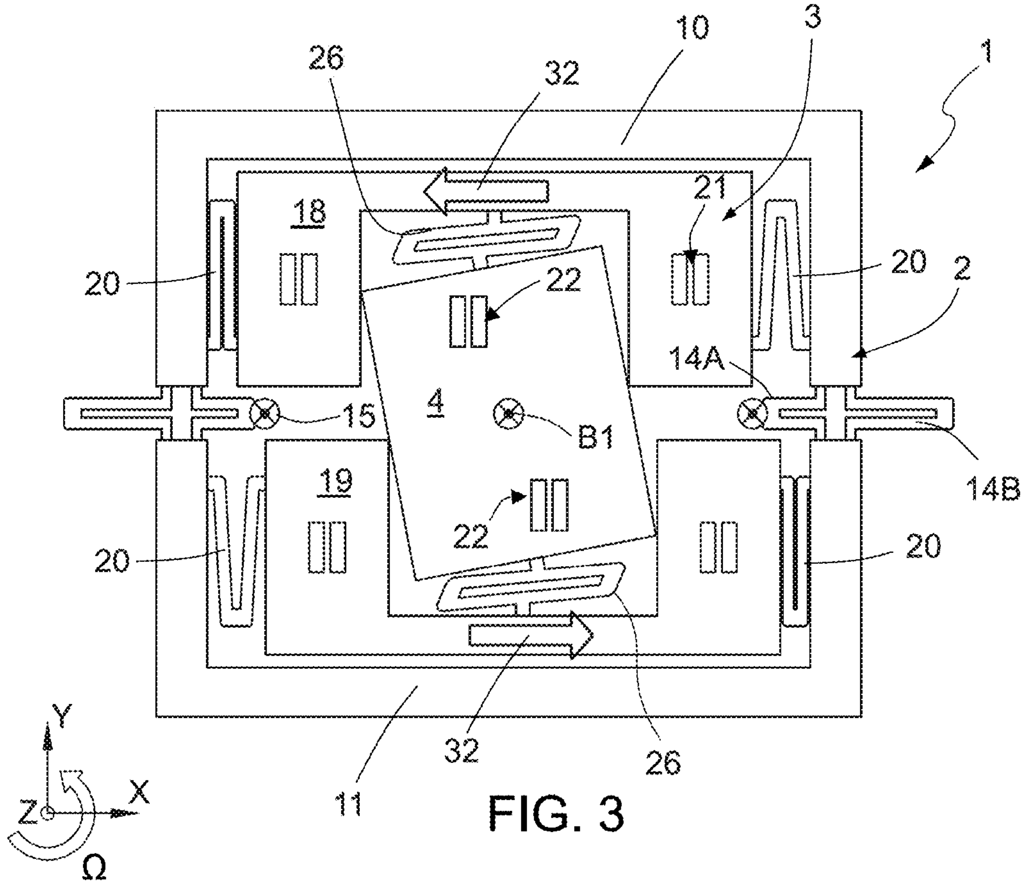
FIG. 3 is a schematic top view of the elementary structure of FIG. 1, in sense mode.

Furthermore, the sense mass 4 is elastically coupled to the Coriolis masses 18, 19 through respective third springs 26 which allow a relative movement between the Coriolis masses 18, 19 and the sense mass 4 in the direction of the second horizontal axis Y (to decouple the drive movement of the Coriolis masses 18, 19 from the sense mass 4, as shown in FIG. 2) and couple the Coriolis masses 18, 19 to the sense mass 4 during the sense movement (to cause the rotation of the sense mass 4 in a sense mode, as shown in FIG. 3 and discussed below).

The gyroscope 1 also has quadrature compensation structures 21, shown schematically; for example, each Coriolis mass 18, 19 may be capacitively coupled to compensation electrodes integral with the support 13.

Figure 6:
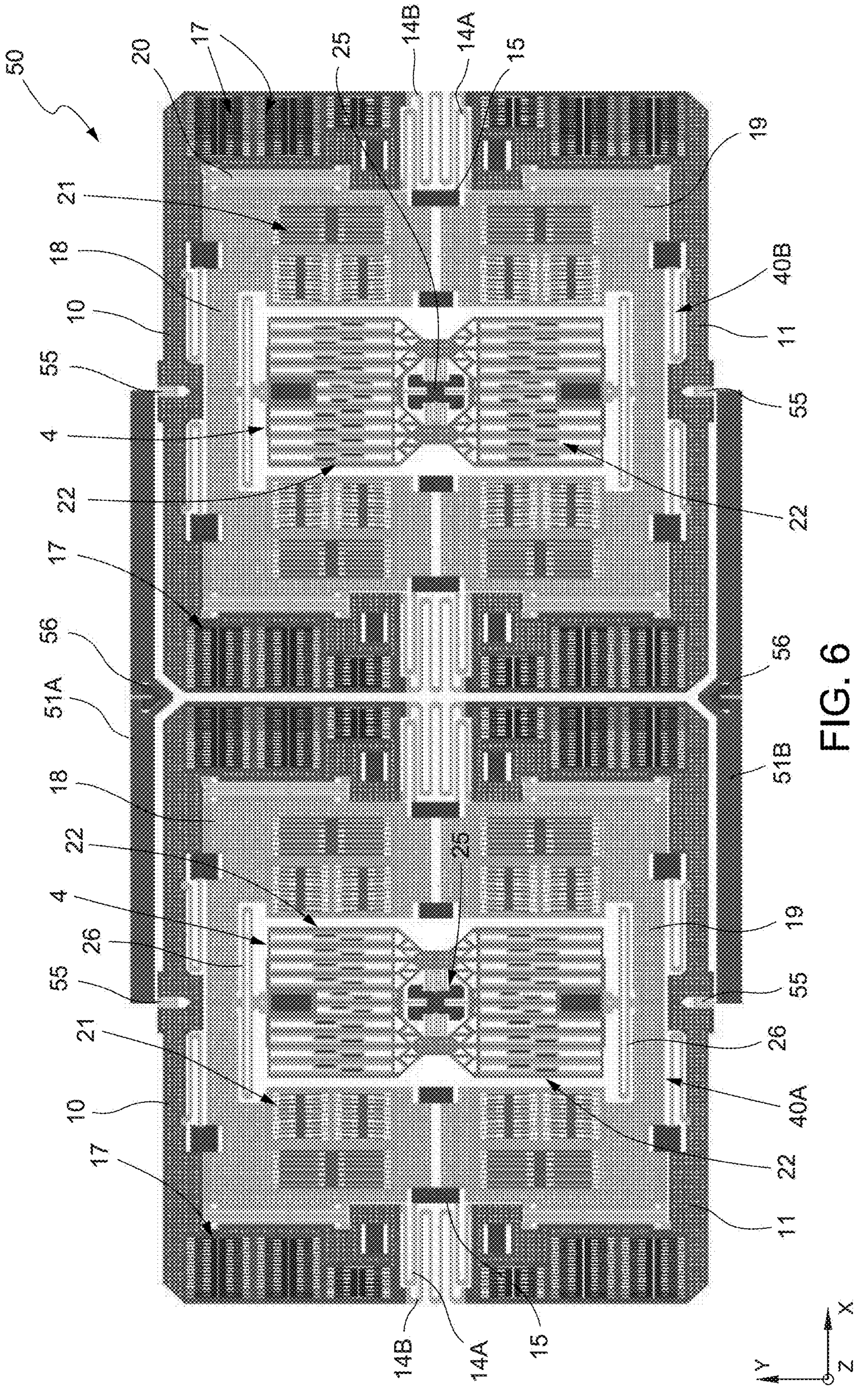
FIG. 6 shows a possible implementation of the gyroscope of FIG. 5, for sensing yaw movements.

The gyroscope also has a sense structure 22, schematically indicated in FIG. 3 and shown in FIG. 6, able to sense the angular position of the sense mass 4. For example, the sense mass 4 may be capacitively coupled to fixed electrodes, carried by the support 13.

The gyroscope 1 of FIG. 1 operates as follows (hereinafter, the movements caused by the actuation and the Coriolis force are described separately as drive mode and sense mode; as obvious to the person skilled in the art and discussed below, the sense movement occurs when the gyroscope 1 is driven along the drive direction).

With reference to FIG. 2 and as indicated above, in the drive mode, the frames 10, 11 are operated by applying drive signals to the actuation assemblies 17 associated with each frame 10, 11. In particular, the drive signals are alternate periodic signals (for example, sinusoidal waves, square waves or other shaped waves), equal and in phase opposition, applied to equivalent elements (for example through comb structures) so as to generate, in each instant, a net harmonic force and to cause drive movements both directed parallel to the second horizontal axis Y, but in the opposite direction. In practice, the frames 10, 11 move with linear motion in the opposite manner, moving away from and towards each other at each half-period of the drive signals, as indicated by arrows 30, 31, directed in the opposite direction.

Thereby, the Coriolis masses 18, 19 are pulled by the frames 10, 11 through the second springs 20, but the sense mass 4 is stationary, being constrained to the support 13 through the sense elastic anchoring system 25 and decoupled from the Coriolis masses 18, 19 (in drive mode) through the third springs 26, which deform.

As shown in FIG. 3, in presence of an angular speed Ω around the vertical axis Z, due to the Coriolis effect, an acceleration parallel to the first horizontal axis X acts on the gyroscope 1. Since the Coriolis masses 18, 19 are actuated in opposite directions, they are subject to accelerations (forces) directed in opposite directions and move correspondingly in phase opposition, as represented in FIG. 3 by arrows 32.

Due to the coupling of the Coriolis masses 18, 19 to the sense mass 4 through the third springs 26 (rigid in the sense direction, here parallel to the first horizontal axis X) and due to the sense elastic anchoring system 25 (which allows the rotation of the sense mass 4), the sense mass 4 rotates around the first barycentric axis B1 (in FIG. 3, counterclockwise, sense movement).

The rotation of the sense mass 4 may be sensed through the angular position sense structure as a distance variation with respect to fixed electrodes (sense structure 22). However, other solutions (sensing as a modification of the facing area) are also possible.

The gyroscope 1 may therefore reliably sense yaw movements (rotations with respect to the vertical axis Z) and, virtually, is not sensitive to linear vibrations.

In fact, vibrations along the first horizontal axis X, which might cause movements of the Coriolis masses 18, 19 along this axis X, cannot be conveyed/transferred to the sense mass 4, since both Coriolis masses 18, 19 would be accelerated in the same direction.

Figure 4:
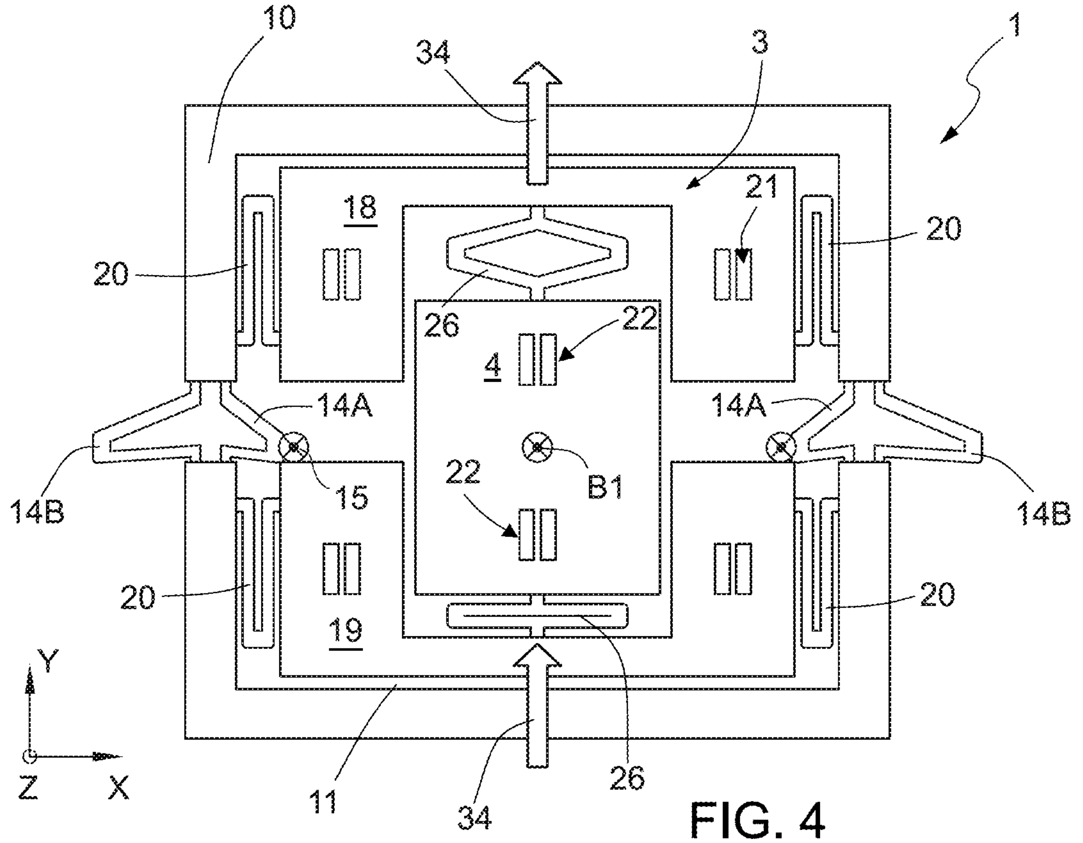
FIG. 4 is a schematic top view of the elementary structure of FIG. 1, in presence of vibrations directed along the drive direction.

As to vibrations along the second horizontal axis Y (which might cause movements of both Coriolis masses 18, 19 along this axis, as shown in FIG. 4 and represented by unidirectional arrows 34), they virtually cause no rotation of the sense mass 4 and therefore are not detectable in case of ideal structure. However, in case of small dimensional inaccuracies and asymmetries due to manufacturing tolerances, for example in presence of a quadrature effect, undesired rotations of the sense mass 4 might occur, interpretable as due to the Coriolis force even in the absence of angular speed Ω along the vertical axis Z.

Figure 5:
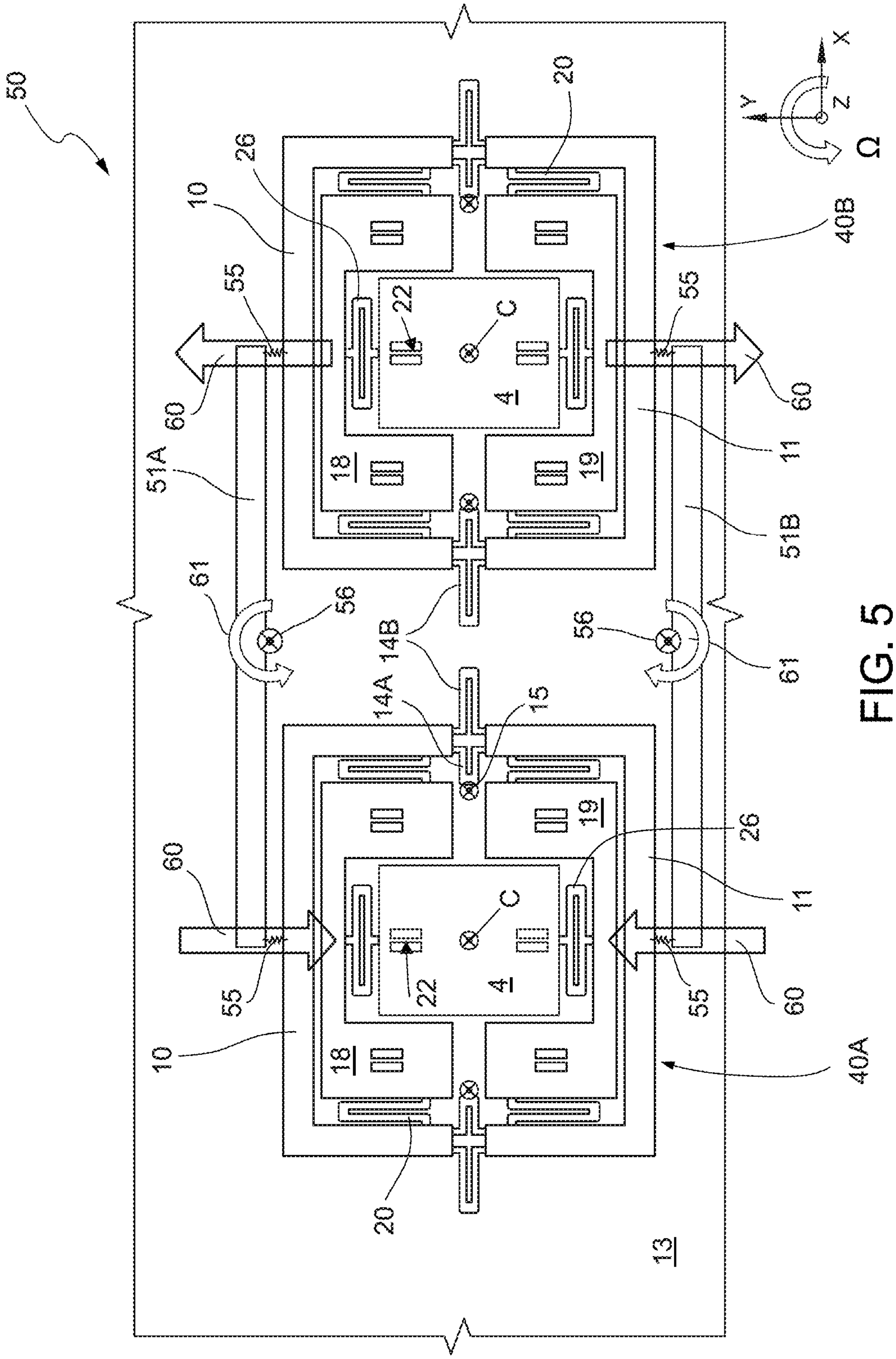
FIG. 5 is a schematic top view of a MEMS gyroscope formed by two elementary structures of FIG. 1.

To improve the stability of the gyroscope 1, a gyroscope has been developed that is also resistant to secondary influences, with doubled structure, as shown in FIG. 5.

FIG. 5 shows a gyroscope 50 comprising two gyroscope units, equal to the gyroscope units of FIG. 1 and therefore identified by the same reference number (but referred to, where useful for understanding, as first gyroscope unit 40A and second gyroscope unit 40B).

The gyroscope units 40A, 40B are mutually coupled through two bridge elements (top bridge element 51A, bottom bridge element 51B).

In detail, in FIG. 5, the top bridge element 51A is coupled to the first frame 10 of each gyroscope unit 40, and the bottom bridge element 51B is coupled to the second frame 11 of each gyroscope unit 40. In particular, the bridge elements 51A, 51B are connected at approximately central points of the respective frames 10, 11. In FIG. 5, the bridge elements 51A, 51B are connected with the respective frames 10, 11 at their respective ends.

The bridge elements 51A, 51B are coupled to the frames 10, 11 through fourth springs 55, shown schematically, substantially rigid in the direction of the second horizontal axis Y and allowing small relative rotations, so that the bridge elements 51A, 51B follow the movement of the frames 10, 11, as explained below.

Furthermore, the bridge elements 51A, 51B are anchored to the support 13 through bridge anchors 56 which are arranged centrally with respect to the same bridge elements 51A, 51B and which allow the rotation thereof around respective axes passing through the bridge anchors 56 and parallel to the vertical axis Z.

In the gyroscope 50 of FIG. 5, the gyroscope units 40 are driven in phase opposition, that is when the frames 10, 11 of the first gyroscope unit 40A move towards the second barycentric axis B2, the frames 10, 11 of the second gyroscope unit 40B move away from the second barycentric axis B2 (as represented by arrows 60 in FIG. 5), and vice versa.

Consequently, the portions of the bridge elements 51A, 51B coupled to the frames 10, 11 (here, the ends of the bridge elements 51A, 51B) move upwards or downwards in FIG. 5 (in a direction, as a first approximation, parallel to the second horizontal axis Y) in an alternate manner, that is the movement in one direction (for example downwards) of the first frame 10 of a gyroscope structure 40 (for example the first gyroscope structure 40A) and the upward movement of the first frame 10 of the other gyroscope structure 40 (in the example, the second gyroscope structure 40B) causes the rotation of the top bridge element 51A in a first direction (in the example, counterclockwise) around its own bridge anchor 56; and vice versa for the second frames 11 and the bottom bridge element 51B, as shown by arrows 61.

Any angular speed Ω acting on the gyroscope 50 therefore causes displacements in opposite directions of the Coriolis masses 18 of the gyroscope units 40A, 40B, and of the Coriolis masses 19 of the gyroscope units 40A, 40B, as well as rotations in opposite directions of the sense masses 4 of the first and the second gyroscope units 40A, 40B. The angular position sense structures 22 of the first and the second gyroscope units 40A, 40B thus provide equal and opposite signals.

In this structure, any vibrations parallel to the second vertical axis Y cannot cause any movement of the frames 10, 11, since any accelerations acting thereon are prevented by the bridge elements 51A, 51B, which cannot translate due to the bridge anchors 56. In any case, as explained above with reference to FIG. 4, any residual vibrations may be canceled.

A possible implementation of the gyroscope 50 for sensing yaw movements is shown in FIG. 6, wherein the gyroscope units 40, as well as the actuation assemblies 17, the quadrature compensation structures 21 and the sense structures 22 are visible.

Figure 7:
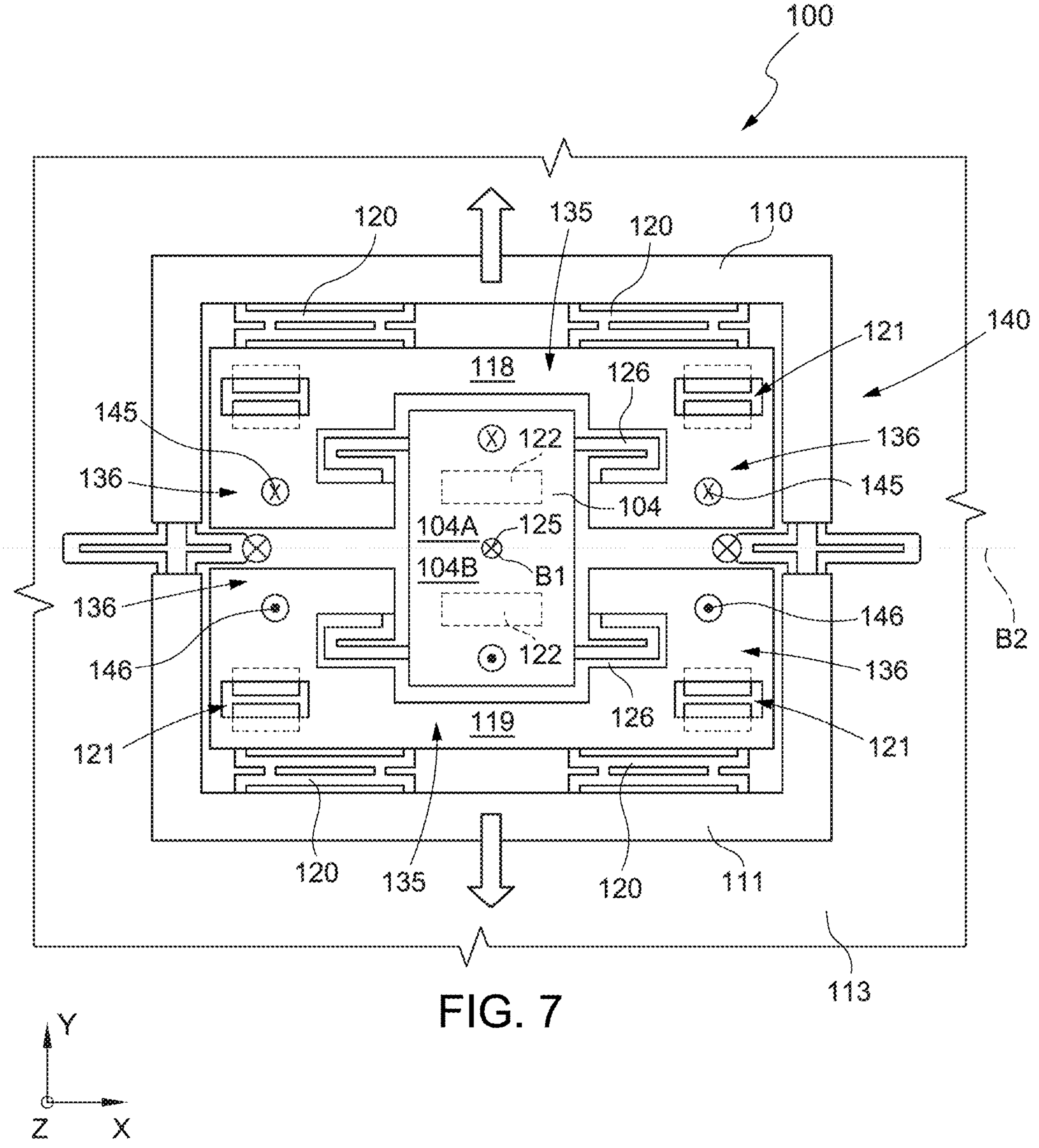
FIG. 7 is a schematic top view of a MEMS gyroscope for sensing pitch/roll movements.

FIG. 7 shows a gyroscope 100 for sensing pitch/roll movements (i.e., rotations of the gyroscope 100 around one of the horizontal axes X, Y of the inertial system XYZ). In particular, the following description refers to the pitch movement; the roll sensing may be sensed by rotating the whole structure by 90° (or through a structure modified by a person skilled in the art).

The gyroscope 100 of FIG. 7 has a base structure similar to the gyroscope 1 of FIG. 1 and operates according to a similar principle, even if based on different movements of the Coriolis masses; consequently, elements similar to those of the gyroscope 1 are indicated with reference numbers increased by 100 and will be described as far as useful.

Specifically, in the gyroscope 100 of FIG. 7, to allow sensing of pitch/roll movements, the Coriolis masses (here indicated by 118, 119) and the sense mass (here indicated by 104) have a degree of freedom along the vertical axis Z.

Here, in particular, in sense mode, the Coriolis masses 118, 119 may rotate in phase opposition around respective hinge axes parallel to the first horizontal axis X and pull, with respective portions, the sense mass (indicated by 104) away from these hinge axes.

Furthermore, the sense mass 104 may rotate around the second barycentric axis B2 (barycentric axis of the gyroscope 1, here forming also a barycentric axis of the sense mass 104 and of the elementary structure, here indicated by 140), parallel to the first horizontal axis X and passing through the first barycentric axis B1 of the sense mass 104.

In detail, in FIG. 7, the frames 110, 111 are driven so as to move parallel to the second horizontal axis Y with alternate and phase-opposition motion, as described above with reference to FIG. 2, and are coupled to the Coriolis masses 118, 119 so that, in drive mode, they also move parallel to the second horizontal axis Y and in phase opposition.

Furthermore, the Coriolis masses 118, 119 are coupled to the frames 110, 111 so that, in sense mode, in presence of any pitch movements of the gyroscope 100 (i.e., rotations around the second barycentric axis B2), they may also rotate around the hinge axes, as described above, and cause the rotation of the sense mass 104. In fact, with the indicated driving, pitch movements give rise to a Coriolis force parallel to the vertical axis Z in opposite directions on the two sides of the second barycentric axis B2; the sense mass 104, rotating, has a displacement component parallel to the vertical axis Z which may be sensed by electrodes arranged on the fixed structure (support 113), for example placed below or laterally to the sense mass 104.

In particular, in the gyroscope 100 of FIG. 7, the sense mass 104 has an elongated shape in a direction parallel to the second horizontal axis Y, with sense portions 104A, 104B arranged on opposite sides of the second barycentric axis B2 and rotating, with respect to a horizontal plane XY, in opposite directions, as explained below. However, while the elongated shape of the sense masses 104 is advantageous, as it allows an optimization of the area, it is not essential.

In FIG. 7, each Coriolis mass 118, 119 still is approximately C-shaped, with a base side 135 and protruding arms 136.

The base side 135 of each Coriolis mass 118, 119 is coupled to the respective frame 110, 111 through the second springs (indicated here by 120) and therefore forms a hinge portion hinged to the respective frame 110, 111; the protruding arms 136 extend towards the second barycentric axis B2.

The second springs 120 are here configured to allow the aforementioned rotation of the Coriolis masses 118, 119 around axes parallel to the first horizontal axis X in the sense mode. The second springs 120 are therefore rigid in the drive direction (parallel to the second horizontal axis Y) but compliant in sense direction (parallel to the vertical axis Z).

Due the opposite drive movement (conveyed by the frames 110, 111 to the respective Coriolis masses 118, 119), the Coriolis force determines opposite rotations of the Coriolis masses 118, 119. Consequently, when for example the first Coriolis mass 118 rotates to cause the free ends of its own protruding arms 136 to move towards the support 113 (moving away from an observer, cross symbol 145 in FIG. 7), the second mass 119 rotates in the opposite direction, and the free ends of its own protruding arms 136 move away from the support 113 (moving towards the observer, dot symbol 146), and vice versa.

Furthermore, the third springs (here indicated by 126), which couple the Coriolis masses 118, 119 (and more precisely the protruding arms 136) to the sense mass 104, are configured to allow the rotation of the sense mass 104.

The sense mass 104 then follows, with its own sense portions 104A, 104B, the movement parallel to the vertical axis Z of the protruding arms 136 with respect to the plane XY, and rotates around the second barycentric axis B2.

Figure 8:
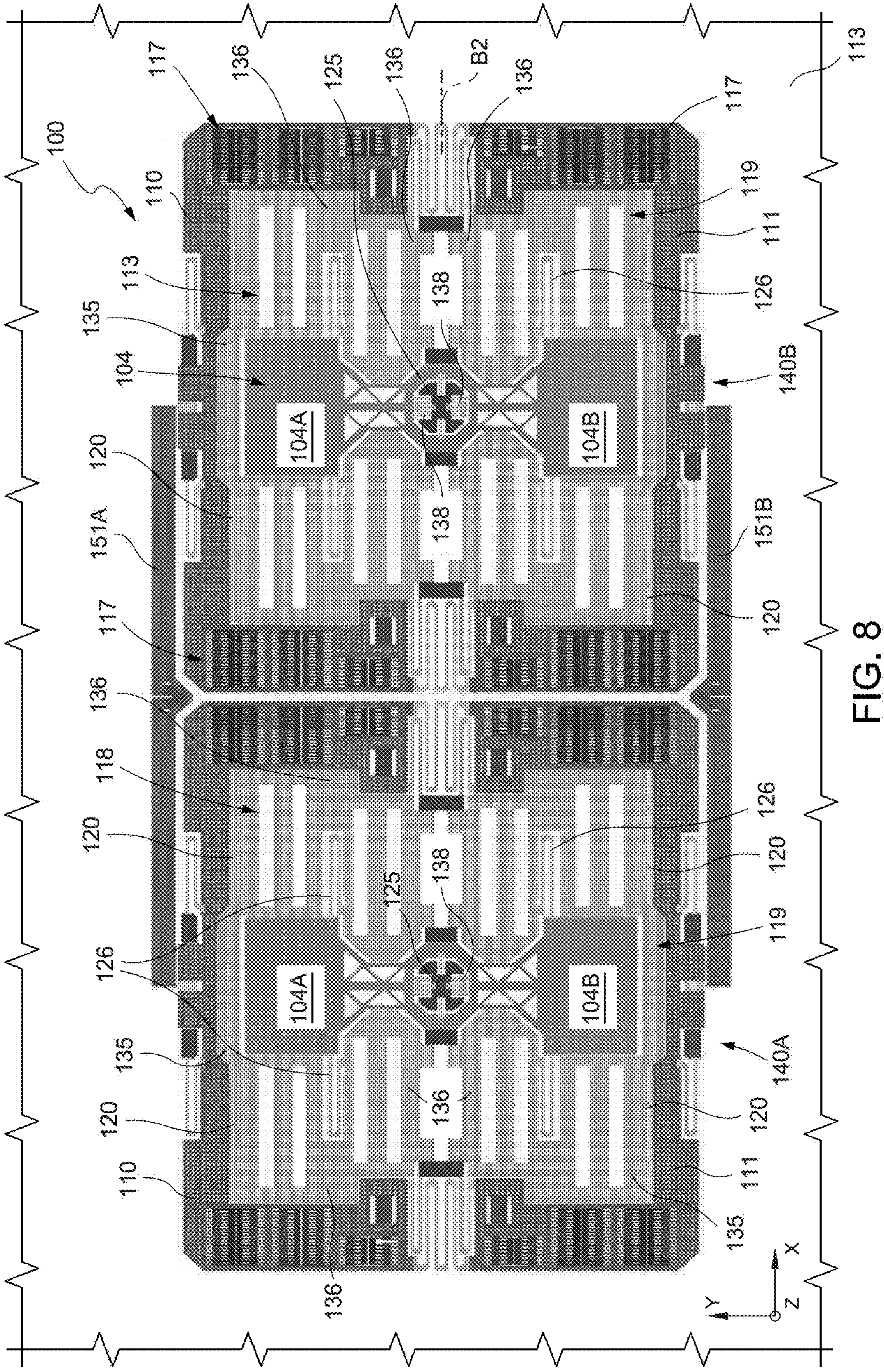
FIG. 8 shows a possible implementation of the gyroscope of FIG. 7.

To allow the rotation of the sense mass 104, it is coupled to the support 113 through a sense elastic anchoring system, schematically indicated by 125 (see FIG. 8).

As mentioned above, the rotation of the sense portions 104A, 104B may be sensed by sense structures 122 (for example electrodes 122, shown schematically, dashed) integral with the support 113 and capacitively coupled to the sense portions 104A, 104B to sense capacitive differences due to the distance variations between the same sense portions 104A, 104B and the support 113.

FIG. 7 also shows quadrature compensation structures 121.

A possible implementation of the gyroscope 100 for sensing yaw movements, doubling the structure to make it more resistant to linear vibrations in the direction of the second horizontal axis Y (similarly to what described with reference to FIG. 5), is shown in FIG. 8, wherein actuation assemblies 117 are also indicated.

Here, the frames 110, 111 are driven so as to move (parallel to the second horizontal axis Y) with phase opposition motion in each gyroscope unit (here indicated by 140A, 140B), similarly to what described above with reference to FIG. 5.

In particular, in the gyroscope 100, the sense portions 104A, 104B (arranged on opposite sides of the second barycentric axis B2) move, with respect to the vertical axis Z, in opposite directions, in the two gyroscope units 140A, 140B, as explained below.

In fact, here, the Coriolis force directed parallel to the vertical axis Z determines opposite rotations of the Coriolis masses 118, 119 in the two gyroscope units 140A, 140B. Consequently, when for example the first Coriolis mass 118 of the first gyroscope unit 140A and the second Coriolis mass 119 of the second gyroscope unit 140B rotate to cause the free ends of their own protruding arms 136 to move towards the support 113, the second Coriolis mass 119 of the first gyroscope unit 140A and the first Coriolis mass 118 of the second gyroscope unit 140B rotate in the opposite direction, so that the free ends of their own protruding arms 136 move away from the support 113, and vice versa.

Consequently, the two sense masses 104 rotate in opposite directions around the second barycentric axis B2; that is, when the first sense portion 104A of one of the gyroscope units 140 (for example of the first gyroscope unit 140A) moves upwards (towards the observer, away from the support 113), the first sense portion 104A of the other gyroscope unit 140 (in the example, of the second gyroscope unit 140B) moves downwards (away from the observer, towards the support 113), and vice versa.

FIG. 8 shows the sense elastic anchoring systems 125, which allow the rotation of the sense masses 104 around the second barycentric axis B2.

The gyroscope 100 of FIG. 8 also has a high resistance to vibrations parallel to the second horizontal axis Y (as well as parallel to the first horizontal axis X), for reasons similar to what described with reference to FIG. 5.

Figure 9:
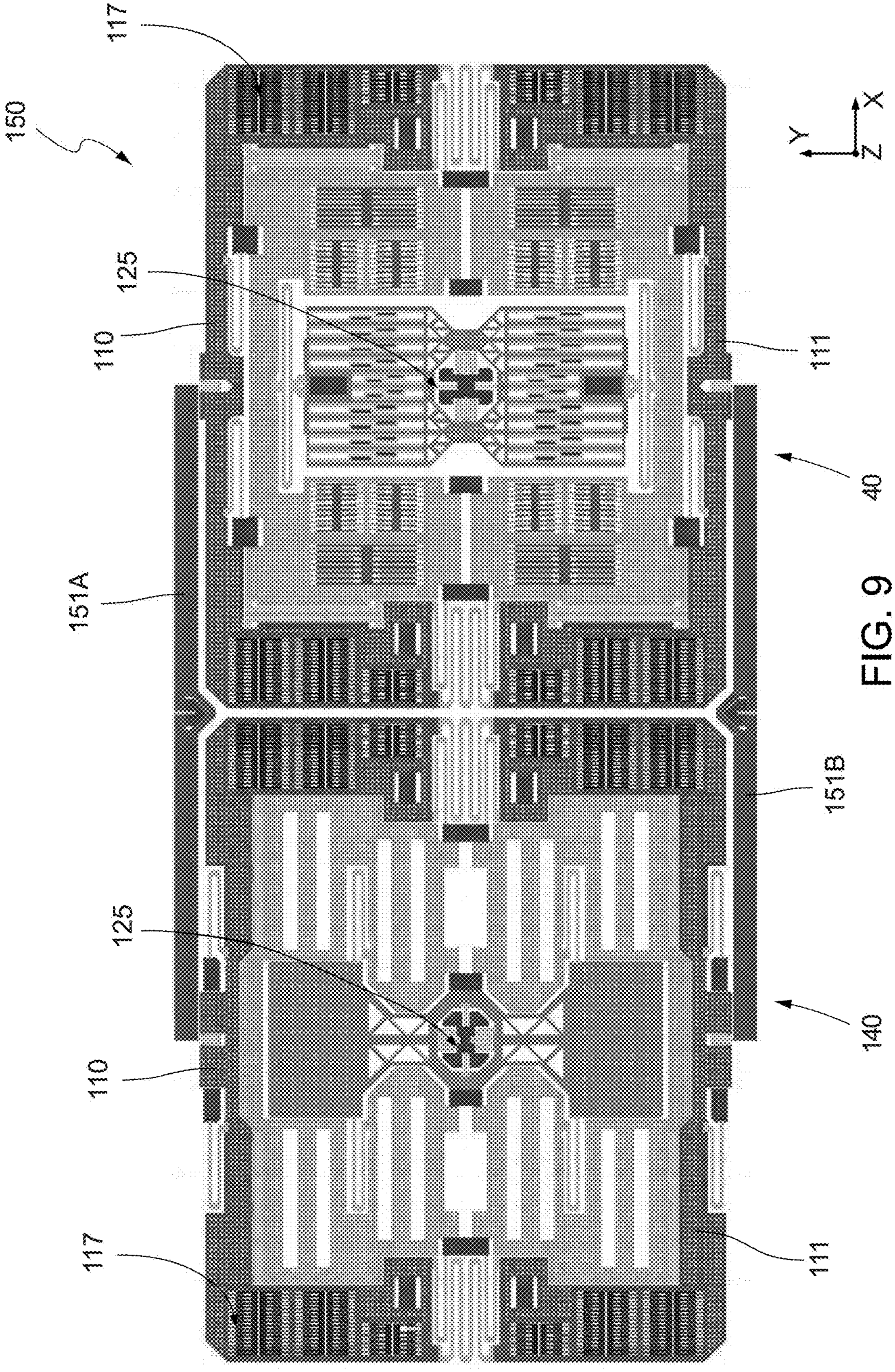
FIG. 9 shows a possible implementation of the gyroscope of FIG. 5, for sensing yaw and pitch/roll movements (biaxial gyroscope)

FIG. 9 shows a gyroscope 150 which couples the structures 40 and 140 of FIGS. 6 and 8 so as to allow both an in-plane sensing (yaw movement) and an out-of-plane sensing (pitch/roll movement).

The gyroscope 150 is particularly advantageous since the presence of a single drive chain for both sense directions (actuation assemblies 117, frames 110, 111, bridge elements 151A, 151B) simplifies the associated control circuits (usually incorporated in separate devices, such as ASICs-Application Specific Integrated Circuits).

The gyroscope 150 also allows the linear vibrations (accelerations) to be rejected, while maintaining good performances and reduced dimensions (for example, 1.5×2.5 mm).

FIG. 10 shows a circuit 160 for sensing angular speeds, usable in association with a MEMS gyroscope, for example applicable to the gyroscopes 1, 50, 100, 150 of FIGS. 1-9.

In particular, the circuit 160 has the function of processing the signals provided by a gyroscope to obtain angular speed data to be provided to a user.

The circuit 160 also has the function of regulating the correct operation of the same gyroscope, in particular with reference to the drive amplitude and frequency and to the quadrature compensation (by generating quadrature compensation voltages).

The circuit 160 comprises a drive stage 161 and a sense stage 162.

In particular, the drive stage 161 is here exemplified by a resonant drive block 165 and by a regulation block (PLL+AGC) 166.

The resonant drive block 165 comprises both the mechanical drive structures (the frames 10, 11, 110, 111 and relative drive structures/electrodes) and the relative circuitry for generating the drive voltages and the movement detection circuitry.

The regulation block 166 comprises circuitry intended for controlling the drive parameters, including circuits for regulating the drive voltages and controlling the gain, and is feedback connected with the resonant drive block 165 so as to closed-loop regulate the amplitude and the frequency of the drive signals of the resonant drive block 165. The regulation block 166 therefore generates an output signal PLL OUT.

The drive stage 161 operates in any manner, for example as described in the document "A 104-dB Dynamic Range Transimpedance-Based CMOS ASIC for Tuning Fork Microgyroscopes" by Ajit Sharma et al., IEEE Journal of Solid-State Circuits, Vol 42. No. 8, August 2007 (see, in particular, FIG. 2 and the relative description in Part II B, "Drive Oscillator").

The sense stage 162 is exemplified here by a resonant sense block 170; a C/V amplifier 171; a first demodulator 172, a second demodulator 173; a PID block 174 and an A/D conversion block 175.

The resonant sense block 170 comprises both the mechanical sense structures (the Coriolis masses 18, 19, 118, 119; the sense masses 4, 104, as well as the sense structures/electrodes) and the quadrature compensation structures (21, 121) and the movement detection circuitry.

The capacitance to voltage conversion amplifier 171 schematized here comprises signal amplifiers connected to the sense structures/electrodes.

The first and the second demodulators 172, 173 demodulate the output signal of the C/V amplifier 171 respectively with the drive signal PLL OUT generated by the regulation block 166 and with a signal phase shifted by 90° (PLL OUT+90°), in order to separate the signal component due to the Coriolis force (Coriolis signal Dem_I, proportional to the angular speed of the sense masses 4, 104) from the quadrature component Dem_Q (proportional to the position of the sense masses 4, 104), as explained in the aforementioned article in Part II B, "Sense Chanel".

The PID block 174 closed-loop controls the compensation voltage applied to the quadrature compensation structures 21 based on the quadrature signal Dem_Q generated by the second demodulator 173.

The A/D conversion block 175, connected to the output of the first demodulator 172, converts the Coriolis signal Dem_I into digital form and outputs an angular speed signal s1, uniquely correlated to the angular speed Ω.

The sense control stage 162 operates broadly as explained above in the aforementioned article in Part II B, "Sense Chanel" or in the article "Quadrature-Error Compensation and Corresponding Effects on the Performance of Fully Decoupled MEMS Gyroscopes", by Erdinc Tatar et al., IEEE Journal of Microelectromechanical Systems, Vol. 21. No. 3, June 2012 (see, in particular, FIG. 4, including the quadrature compensation loop).

While the diagram of FIG. 10 allows a reliable regulation of the operation of a gyroscope in most applications, in some applications more stringent checks are desired, to ensure high safety conditions. This is the case, for example, of a gyroscope used in the automotive field for controlling parameters of vehicle parts and for checking driving conditions, to satisfy the vehicle and/or people safety conditions desired nowadays.

In these cases, it is often desired to have active confirmations that the controlled parameters, quantities and conditions match the design characteristics or expected values and signaling is generated, for example through flags or alarm signals, conversely.

FIG. 11 shows an angular speed sense circuit 180 usable for the purpose of monitoring the offset and sensitivity stability of a MEMS gyroscope, for example of the gyroscopes 50, 100 of FIGS. 5, 6 and 8.

To this end, the angular speed sense circuit 180 comprises a drive control stage, similar to the drive control stage 161 of FIG. 10 and therefore indicated with the same reference number, and two sense control stages, each similar to the sense control stage 162 of FIG. 10 and therefore indicated as first and second sense control stages 162.1, 162.2.

In the angular speed sense circuit 180, each sense control stage 162.1, 162.2 is an independent processing channel and comprises one own resonant sense block 170; for example, the first sense control stage 162.1 may be associated with the sense mass 4, 104 of the first gyroscope unit 40A, 140A of FIG. 5, 6 or 8 (as well as with the corresponding Coriolis masses 18, 19, 118, 119) and the second sense control stage 162.2 may be associated with the corresponding parts of the second gyroscope unit 40B, 140B of FIG. 5, 6 or 8.

Similarly to FIG. 10, each sense control stage 162.1, 162.2 comprises, in addition to the respective resonant sense block 170, a C/V amplifier 171; a first demodulator 172 (generating a demodulated rate signal Dem_I.1, resp. Dem_I.2), a second demodulator 173 (generating a demodulated quadrature signal Dem_Q.1, resp. Dem_Q.2); a PID block 174 and an A/D conversion block 175 (generating an angular speed signal s1.1, resp. s1.2, uniquely correlated to the angular speed 52, as sensed by its own processing channel).

Obtaining two angular speed signals s1,1, s1.2 from two virtually identical, but distinct, channels, allows the operation of the system to be monitored more widely and the safety conditions to be assessed.

Figure 12:
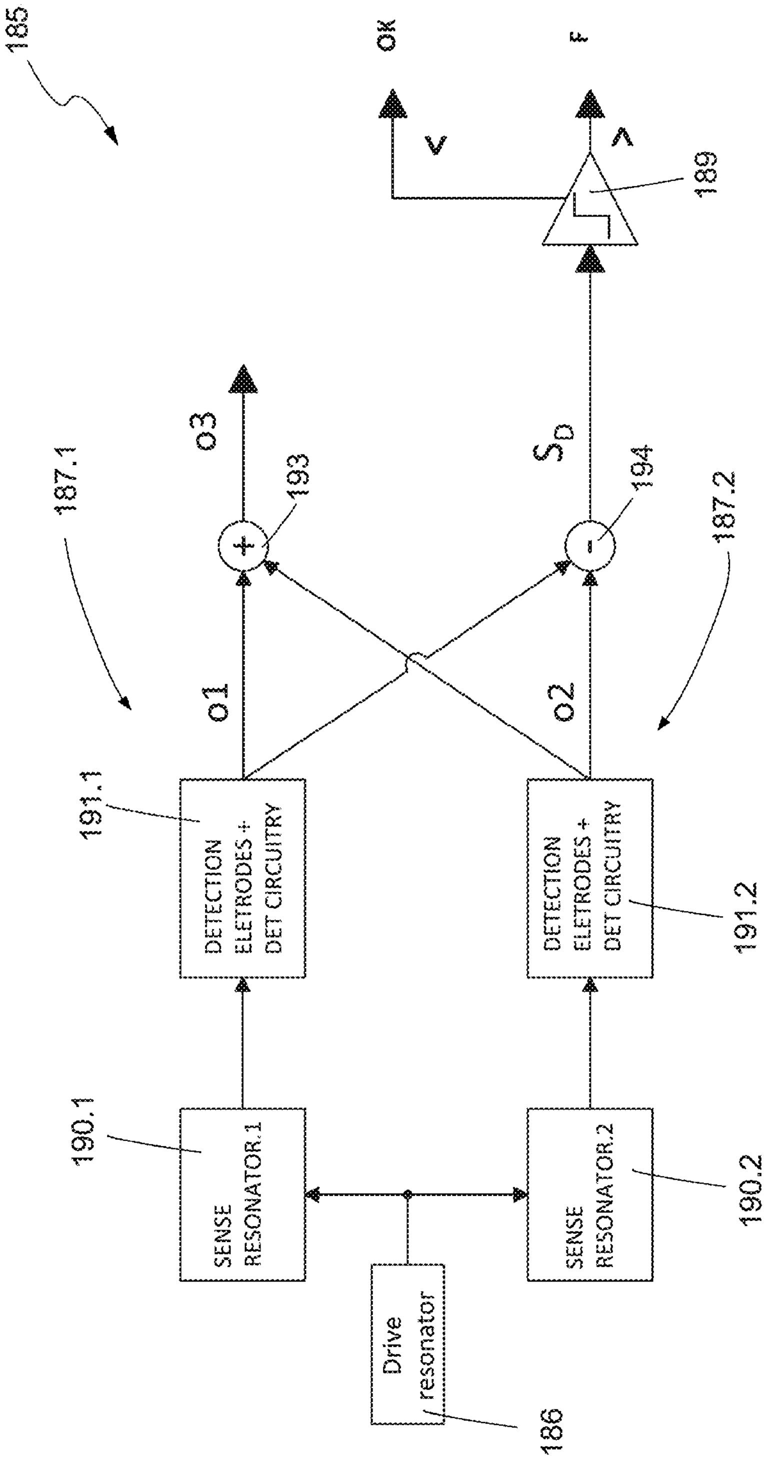
FIG. 12 shows a block diagram of a signalling system using the system for controlling parameters of FIG. 11.

For example, the angular speed signals s1,1, s1.2 may be used as shown in the diagram of FIG. 12, relating to a gyroscope system 185 configured to generate safety condition signaling. In FIG. 12, the gyroscope system 185 comprises a double sense-channel gyroscope, represented in a very schematic manner, and safety monitoring circuitry.

In detail, the gyroscope system 185 comprises a resonant drive block 186, a first sense channel 187.1, a second sense channel 187.2, and a threshold comparator 189.

The resonant drive block 186 may correspond to the resonant drive block 165 of FIGS. 10 and 11; in particular, it may be coupled to a regulation block PLL+AGC, similar to the regulation block 166 of FIGS. 10 and 11.

The first and the second sense channels 187.1, 187.2 are equal to each other and each comprise a respective movement resonator 190.1, 190.2 and a respective detection structure 191.1, 191.2.

The movement resonators 190.1, 190.2 of FIG. 12 are equal to each other and may correspond to the resonant sense blocks 170 of FIG. 11; in particular, they may be formed by the sense masses 4, 104 of the gyroscope units 40A, 40B; 140A, 140B of FIGS. 5, 6 and 8. The movement resonators 190.1, 190.2 may be coupled to respective quadrature compensation loops (for example to blocks 173, 174 of FIG. 11 or to other quadrature control circuits).

The detection structures 191.1, 191.2 are equal to each other and comprise detection electrodes and processing circuits of the signals sensed through said electrodes; for example, they may correspond to blocks 171, 172 and 175 of the first and the second sense control stage 162.1, 162.2 of FIG. 11 or to similar blocks.

The detection structures 191.1, 191.2 generate respective channel angular speed signals o1, o2 provided to a sum block 193, which sums them and generates an output angular speed signal o3 at output. The output angular speed signal o3 has a complete dynamics with respect to the mechanical/electronic structure and may be used by a processing system or apparatus to obtain parameters useful for operation, for example for controlling the driving conditions and/or organs and devices mounted on motor vehicles.

If the sense channels 187.1, 187.2 were identical, the channel angular speed signals o1, o2 would be equal. Actually, since the two sense channels 187.1, 187.2 are distinct, normally, in correct operation condition, the channel angular speed signals o1, o2 differ a little, due to manufacturing tolerances, small dimensional or shape variations, or small differences in the processing circuits.

In certain circumstances, however, for example due to a different drift of the respective characteristics over time, the malfunction of one of the sense channels 187.1, 187.2, the fatigue or initial breakdown of one of the movement resonators 190.1, 190.2, the channel angular speed signals o1, o2 may differ in a significant, sensable manner.

The gyroscope system 185 therefore comprises a difference block 194, which subtracts the channel angular speed signals o1, o2 from each other so as to output a difference signal $S_D$, and a threshold comparator 189 which compares the difference signal $S_D$ with a set threshold. If the difference signal $S_D$ is lower than the set threshold, the threshold comparator 189 outputs a correct operation signal (ok in FIG. 12); if the difference signal $S_D$ is lower than the set threshold, the threshold comparator 189 outputs an alarm signal (for example a flag F) for suitable processing circuits provided in the apparatus or for a suitable control system.

If the detection structures 191.1, 191.2 comprise A/D converters as shown in FIG. 11, they may further include respective high-pass filters; in this case the threshold comparator 189 may compare the difference between the digital angular speed signals with a suitable threshold.

For example, the channel angular speed signals o1, o2 may differ in a non-negligible manner due to the package and in particular due to the presence of soldering regions or due to the bending of the board having the die integrating the gyroscope mounted thereon ("PCB bending" phenomena), with asymmetrical effects on the semiconductor substrate, for example, on the support 13, 113 of FIGS. 1-9.

This may lead to gain variations of the sense channels 187.1, 187.2. In this case, filtering the channel angular speed signals o1, o2 with a low-pass filter may also be useful.

Figure 13:
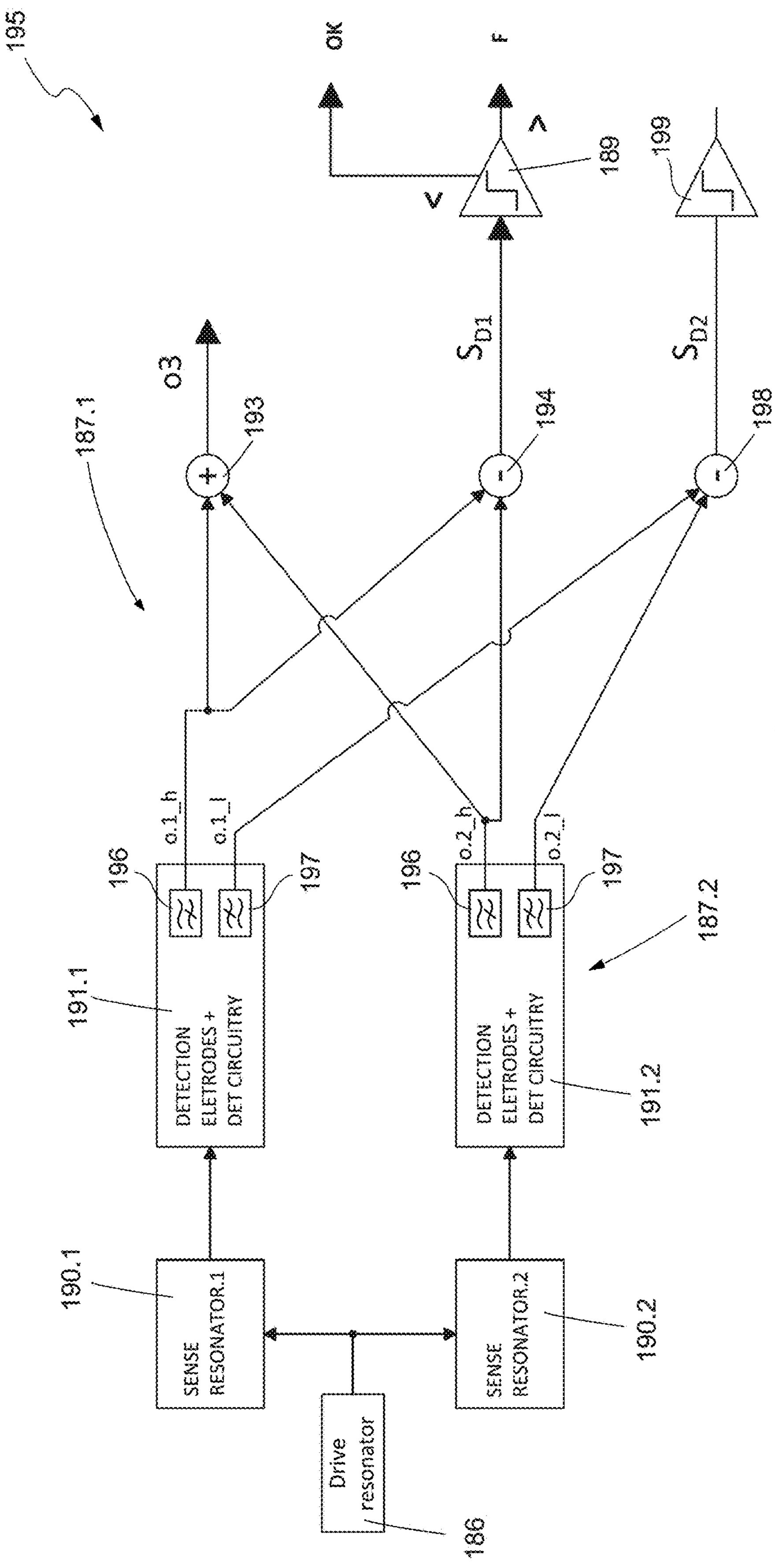
FIG. 13 shows a block diagram of another signalling system using the control system of FIG. 11.

For example, FIG. 13 shows a gyroscope system 195 comprising a first and a second sense channel 187.1, 187.2 similar to the homonymous channels of FIG. 12, wherein the detection structures 191.1, 191.2 comprise, each, both a high-pass filter 196 (generating respective first digital angular speed signals o1_*h*, o2_*h*), and a low-pass filter 197 (generating respective second digital angular speed signals o1_1, o2_1).

The first digital angular speed signals o1_*h*, o2_*h* are provided both to the sum block 193 and to a first difference block 194 (similar to the difference block 194 of FIG. 12 and therefore indicated with the same reference number) for generating the output angular speed signal o3 and the difference signal, here indicated as first difference signal $S_{D1}$, similarly to what described above for FIG. 12.

The first difference signal $S_{D1}$ is provided to a first threshold comparator 189, similar to the threshold comparator 189 of FIG. 12 and therefore indicated with the same reference number.

Furthermore, the second digital angular speed signals o1_1, o2_1 are provided to a second difference block 198 which generates a second difference signal $S_{D2}$, provided to a second threshold comparator 199.

In this manner, drift phenomena may be highlighted.

In fact, by naming G.1 and, respectively, G.2 the gain of the sense channels 187.1, 187.2 and, respectively, ZRL.1, ZRL.2 their offsets (null input condition output, i.e., with gyroscope stationary), it is:

$$o1 = G.1\Omega + ZRL.1$$

$$o2 = G.2\Omega + ZRL.2$$

The output angular speed signal o3 is therefore given by:

$$o3 = \frac{G.1\Omega + G.2\Omega}{2} = \frac{G.1 + G.2}{2}\Omega + \frac{ZRL.1 + ZRL.2}{2}$$

Conversely, the first difference signal $S_{D1}$, after the high-pass filtering, is equal to $$S_{D1} = (G.1 - G.2)\Omega$$

which may be directly compared with a first threshold Th1.

Conversely, the second difference signal $S_{D2}$, after the low-pass filtering, is equal to $$S_{D2} = (G.1 - G.2) + (ZRL.1 - ZRL.2)$$

which, together with the information given by the first difference signal $S_{D1}$, provides information on a possible offset differential drift (ZRL.1–ZRL.2).

The presence of two distinct, but equal, channels allows a lot of information on the operation of the gyroscope to be acquired.

For example, in case of wide displacements of a mass, such as the sense mass 4, 104 of FIG. 5, 6 or 8, harmonic distortions may be generated. The response of a system to such distortions resides in the generation of odd harmonics which may cause, if frequency tuned with spurious sense modes, offset changes and gain in the gyroscope.

Furthermore, spurious mode frequency adaptations may also be triggered by stress due to packaging or assembling process by customers.

The presence of two sense channels 187.1, 187.2 allows these problems to be highlighted and compensation measures to be introduced or in any case the defective components to be replaced, increasing the safety of the systems using them.

FIGS. 14A-14G show in an extremely simplified manner different base structures of gyroscopes and their behavior in presence of Coriolis forces and vibrations both of linear type (spurious movements of the gyroscope parallel to the main extension direction) and of rotational type (spurious movements of the gyroscope around one of the inertial axes).

In particular, in FIGS. 14A-14G, the gyroscopes comprise one or more movable masses (M1-M4) which are driven with alternate rectilinear motion at a drive frequency fd along a drive axis Dr (as described below and represented by arrows D1-D4) and which rotate around a rotation axis R due to an external rotational field (angular speed Ω).

In particular, in FIGS. 14A-14E, the movable masses M1-M4 are constrained to a bearing structure so as to be able to translate, in presence of Coriolis forces (indicated by arrows Co1-Co4), along a sense direction S perpendicular to the drive direction Dr and to the rotation axis R (translational Coriolis motion).

Figure 14A:
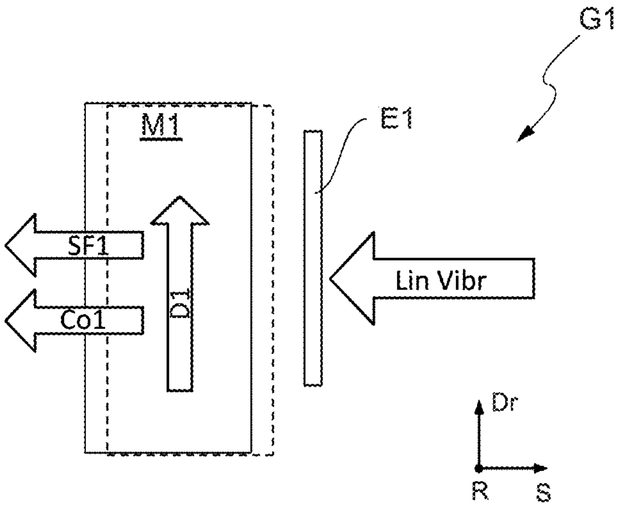
FIGS. 14A-14G show extremely simplified diagrams of different gyroscope configurations and of the accelerations acting thereon due to the Coriolis effect and to linear and/or rotational vibrations.
Figure 14B:
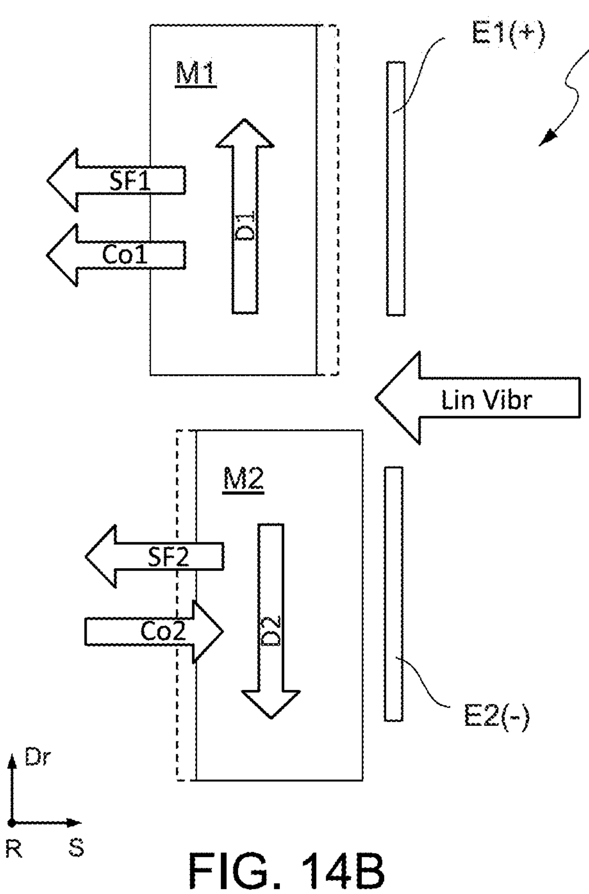
Figure 14C:
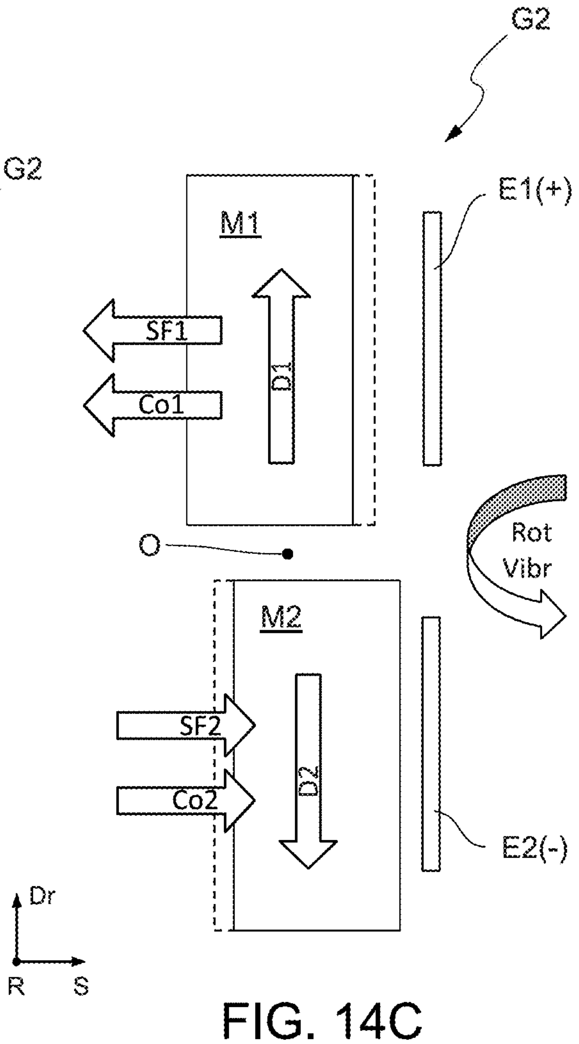
Figure 14D:
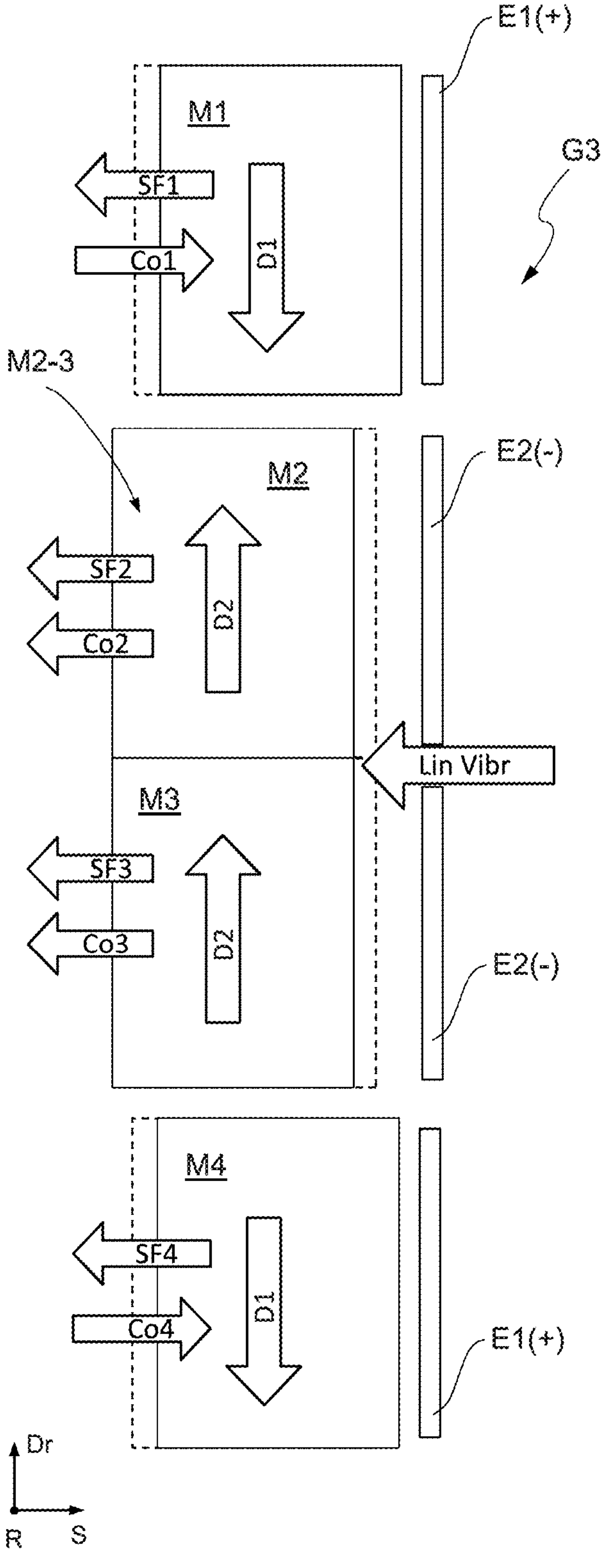
Figure 14E:
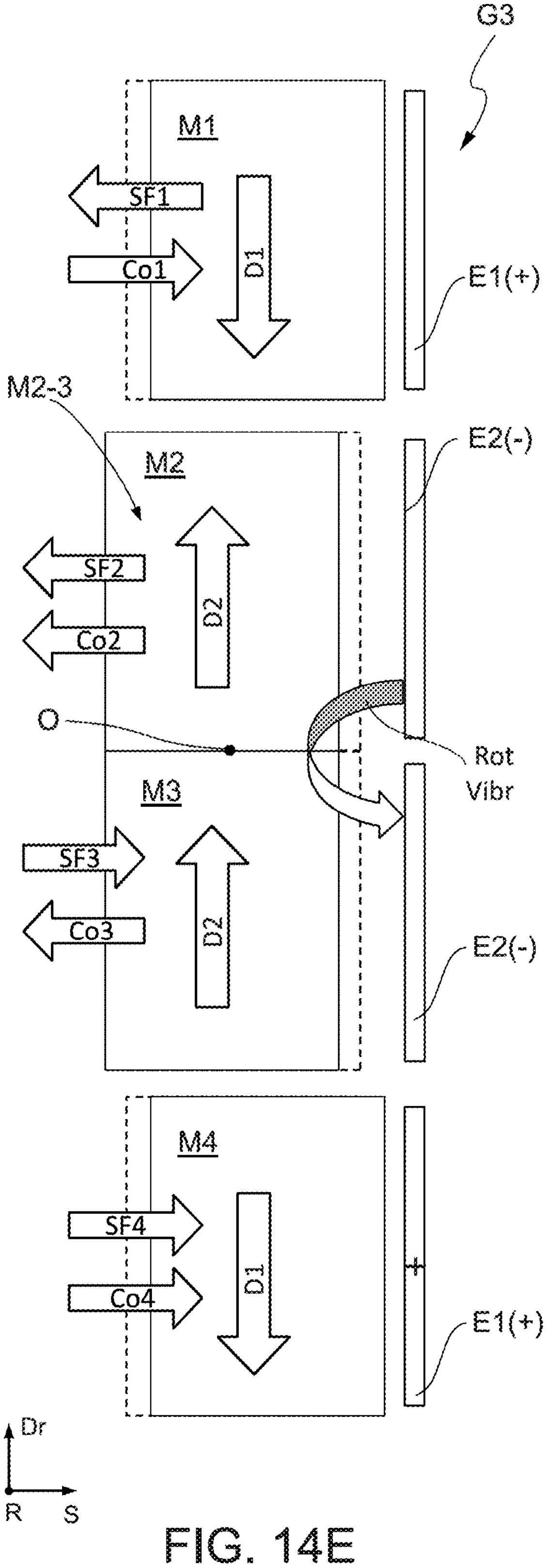
Figure 14F:
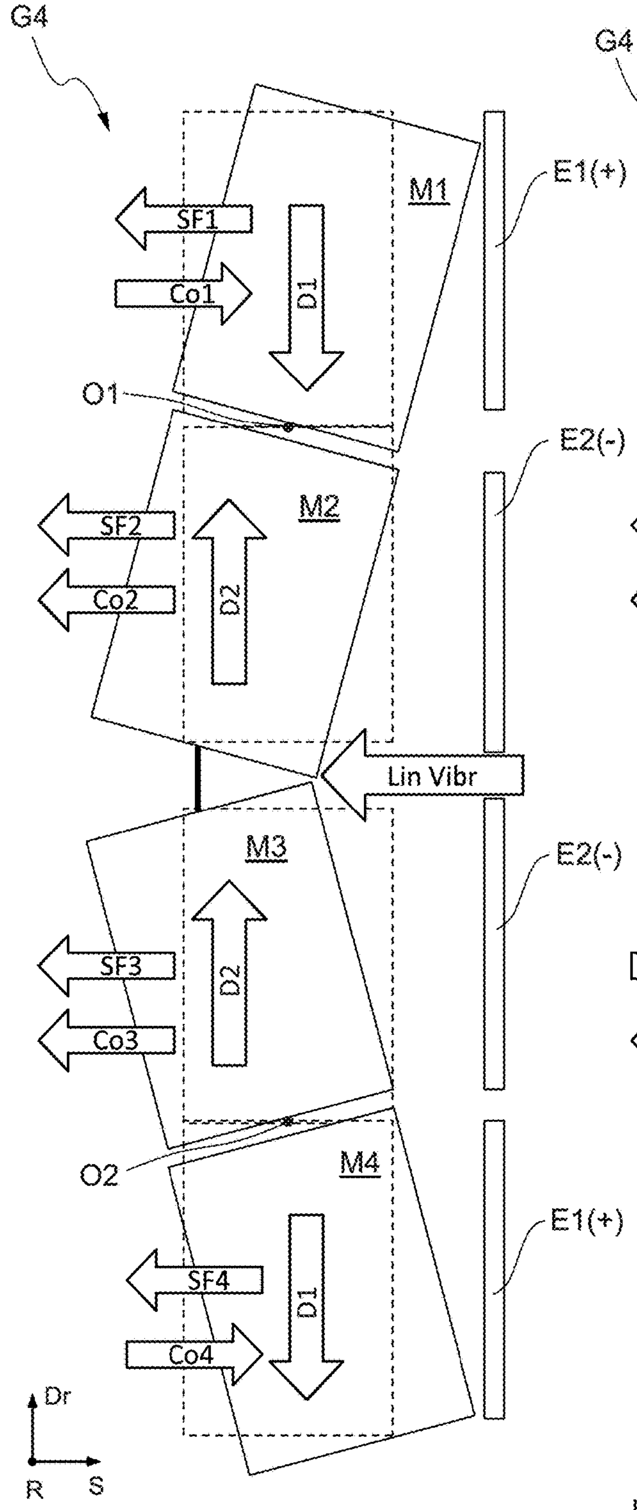
Figure 14G:
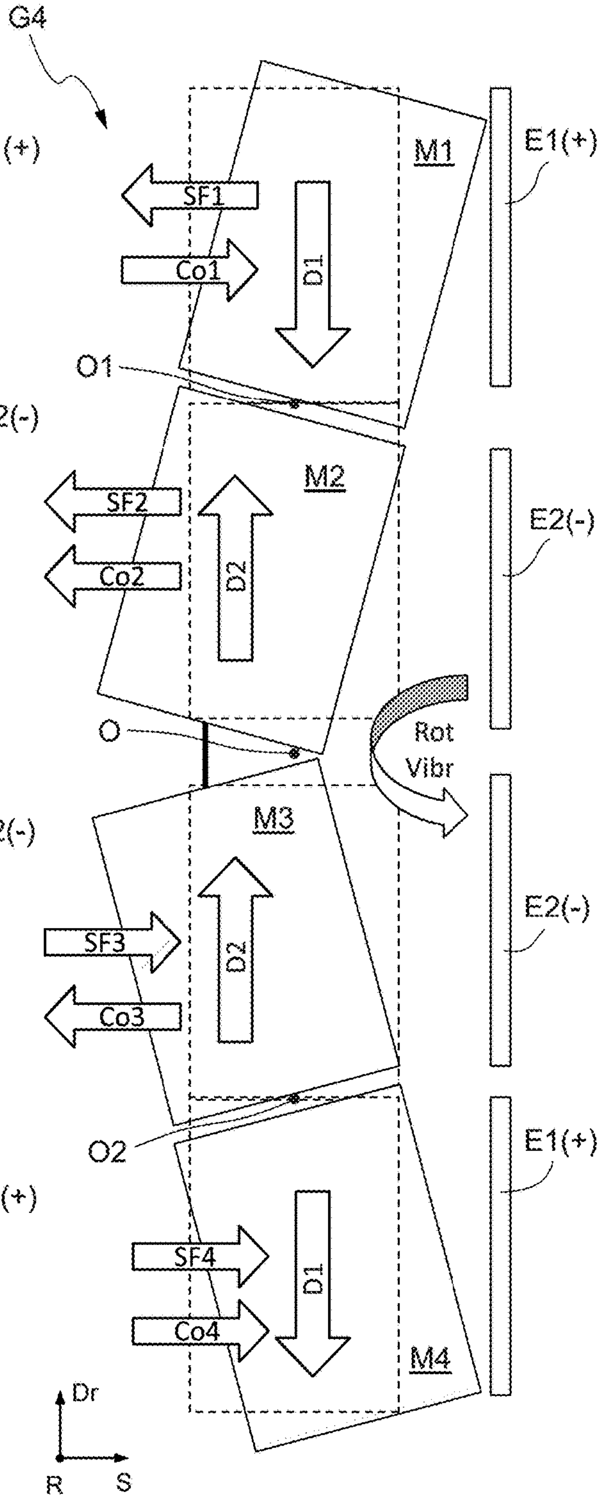

In FIGS. 14F-14G, the movable masses M1-M4 are constrained to a bearing structure so as to be able to rotate around axes parallel to the rotation axis R in presence of Coriolis forces (indicated by arrows Co1-Co4, rotational Coriolis motion).

In all Figures, dashed lines indicate the rest positions of the movable masses M1-M4 and solid lines indicate possible end-of-displacement positions, due to the Coriolis forces.

For example, in FIGS. 14A-14E, the drive Dr and sense S axes may be the horizontal axes X, Y of the gyroscope; in FIGS. 14F-14G, the drive Dr and sense S axes may be the second horizontal axis Y and the vertical axis Z of the gyroscope.

Furthermore, FIGS. 14A-14G show the forces (accelerations) acting on the movable masses M1-M4 in presence of linear vibrations, acting along the sense direction S (arrows Lin Vibr) and in presence of rotational vibrations, acting around the rotation axis R (arrows Rot Vibr).

FIGS. 14A-14G also show, through arrows, spurious forces SF, SF1-SF4 due to spurious vibrations of the respective gyroscope G1-G3, which may act on the movable masses M1-M4 in the same directions as the Coriolis forces. It is therefore desirable to reject the spurious forces SF, SF1-SF4 to be able to correctly calculate the angular speed that gives rise to the displacements of the masses M1-M4.

In these Figures, sense structures E1-E4 are also shown, for example electrodes capacitively coupled to the movable masses M1-M4 to sense the movements thereof, for example as distance variations.

In particular, FIG. 14A shows a gyroscope G1 having a movable mass M1, driven with alternate rectilinear motion along the drive axis Dr (drive movement D1).

The Coriolis force acting on the movable mass M1 in the sense direction S is indicated by arrow Co1. Any spurious vibration parallel to the sense axis (arrow SF1) may act on the movable mass M1 in the same direction as the Coriolis force Co1 and may cause a spurious movement not distinguishable from the sense movement.

Therefore, the gyroscope G1 is not resistant to linear vibrations.

FIG. 14B shows a gyroscope G2 having two movable masses (first and second movable masses M1, M2), equal to each other (same shape, same inertial mass m, same support structures, driven in phase opposition along the drive axis Dr, as represented by arrows D1, D2.

A first sense structure E1 is coupled to the first movable mass M1 and a second sense structure E2 is coupled to the second movable mass M2.

Due to the opposite driving, the Coriolis forces acting on the movable masses M1, M2 are directed in opposite directions (arrows Co1, Co2). Conversely, a spurious vibration directed parallel to the sense axis S (arrow Lin Vibr) gives rise to spurious forces SF1, SF2 (respectively on the first movable mass M1 and on the second movable mass M2) both directed in the same direction. Consequently, in each drive period, in one of the two movable masses M1, M2, the spurious force is directed in the same direction as the Coriolis force (in FIG. 14B, on the first movable mass M1) and, in the other movable mass M2, M1, the spurious force is directed in the opposite direction with respect to the Coriolis force (in the situation shown in FIG. 14B, on the second movable mass M2).

In practice, in FIG. 14B the movement due to the spurious vibration Lin Vibr acts in the same direction as the (Coriolis) sense movement on one movable mass and in the opposite direction on the other movable mass. The spurious vibration Lin Vibr may thus be sensed and canceled, for example by subtracting the sense signals measured on the movable masses M1, M2.

Therefore, the gyroscope G2 is resistant to linear vibrations.

FIG. 14C shows the behavior of the same gyroscope G2 in presence of rotational vibrations.

Also here, the Coriolis forces acting on the movable masses M1, M2 are directed in opposite directions (arrows Co1, Co2). However, even a spurious rotational vibration causing a rotation of the gyroscope G2 around a barycentric axis O (arrow Rot Vibr) gives rise to spurious forces SF1, SF2 directed in opposite directions along the sense axis S. Consequently, the spurious forces SF1, SF2 are directed in the same direction as the Coriolis force Co1, Co2 in both movable masses M1, M2 and cause a movement in the same direction as the sense movement. Since the movement due to the rotational vibration is concordant with the sense movement in both movable masses M1, M2, it cannot be distinguished from the movement due to the Coriolis force.

The same also applies to the drive half-period wherein the spurious forces SF1, SF2 are directed in the opposite direction with respect to the Coriolis forces Co1, Co2; however, they would not be distinguishable.

Therefore, the gyroscope G2 is not resistant to rotational vibrations.

FIG. 14D shows a gyroscope G3 comprising four movable masses M1, M2, M3, M4, equal to each other (same shape, same inertial mass m, same support structures) and arranged side by side along a direction, here the drive axis Dr, wherein the movable masses M1-M4 may translate parallel to the sense axis S perpendicular to the drive axis Dr, when the gyroscope G3 rotates around the rotation axis R.

In the gyroscope G3, the two furthest movable masses (first and fourth movable masses M1, M4, hereinafter also referred to as external movable masses) are driven with the same phase (arrow D1) and the two adjacent movable masses (second and third movable masses M2, M3, hereinafter also referred to as central movable masses) are driven with the same phase, but in phase opposition to the two external movable masses M1, M4 (arrows D2 opposite to arrows D1).

Since the second and third movable masses M2, M3 are driven with the same phase, they may be joined and form a single central movable mass M2-3.

Sense structures E1-E4 are each coupled to a respective movable mass M1-M4.

Due to the opposite driving, the Coriolis forces acting on the external movable masses M1 and M4 (arrows Co1, Co4) are directed in the opposite direction with respect to the Coriolis forces acting on the central movable masses M2 and M3 (arrows Co2, Co3). Conversely, a spurious vibration directed parallel to the sense axis S (arrow Lin Vibr) gives rise to spurious forces SF1-SF4 all having the same direction. Consequently, in two movable masses (in FIG. 14D, in the external movable masses M1, M4), the spurious force (SF1, SF4) is directed in the opposite direction to the Coriolis force Co1, Co4 and, in other two movable masses (in FIG. 14D, in the central movable masses M2, M3), the spurious force (SF2, SF3) is directed in a concordant direction with the Coriolis force.

In practice, in each drive half-period, the spurious vibration is concordant with the sense movement in two movable masses and is discordant in the other two movable masses. The spurious vibration Lin Vibr may thus be sensed and canceled.

Therefore, the gyroscope G3 is resistant to linear vibrations.

FIG. 14E shows the same gyroscope G3 as FIG. 14D in presence of rotational vibrations Rot Vibr.

Also here, the Coriolis forces acting on the external movable masses M1, M4 (arrows Co1, Co4) are directed in mutually concordant directions, opposite with respect to the Coriolis forces acting on the central movable masses M2, M3 (arrows Co2, Co3). Here the spurious rotational vibration (arrow Rot Vibr) gives rise to spurious forces SF1-SF4 which tend to cause the gyroscope G3 to rotate around its own barycenter O and therefore have opposite directions on the two sides of the barycenter O. In practice, the spurious forces SF1, SF2 acting on the first and the second movable masses M1, M2 are opposite to the spurious forces SF3, SF4 acting on the third and the fourth movable masses M3, M4.

Consequently, the movable masses M1-M4 have Coriolis forces and spurious forces acting differently in the different movable masses M1-M4. For example, in FIG. 14E, the forces (Co1, SF1; Co3, SF3) acting on the first and the third movable masses M1, M3 have opposite direction; the forces (Co2, SF2; Co4, SF4) acting on the second and the fourth movable masses M2, M4 have concordant direction.

Due to the different behavior of the movable masses M1-M4, the movement caused by the Coriolis force may be distinguished from the movement caused by the rotational vibration Rot Vibr.

Consequently, the gyroscope G3 is also resistant to rotational vibrations.

FIG. 14F shows a gyroscope G4 comprising four movable masses M1, M2, M3, M4, equal to each other (same shape, same inertial mass m, same support structures) arranged side by side along one direction, here the drive axis Dr.

Here, the movable masses M1-M4 are coupled two by two, that is they form mass pairs (first pair M1-M2, second pair M3-M4) which may rotate around rotation axes O1, O2 barycentral for each mass pair.

Furthermore, in the gyroscope G4, the two external movable masses (first and fourth movable masses M1, M4) are driven with the same phase (arrow D1) and the two central movable masses (second and third movable masses M2, M3) are driven with the same phase, but in phase opposition to the external movable masses M1, M4 (arrows D2 opposite to arrows D1).

Similarly to what described for FIG. 14D, due to the opposite driving, the Coriolis forces acting on the external movable masses M1 and M4 (arrows Co1, Co4) are concordant with each other and opposite with respect to the Coriolis forces acting on the central movable masses M2 and M3 (arrows Co2, Co3). Conversely, a spurious vibration directed parallel to the sense axis S (arrow Lin Vibr) gives rise to spurious forces SF1-SF4 all having the same direction. Consequently, in two movable masses (in FIG. 14F, in the external movable masses M1, M4), the spurious force (SF1, SF4) is directed in the opposite direction to the Coriolis force Co1, Co4 and, in other two movable masses (in FIG. 14D, in the central movable masses M2, M3), the spurious force (SF2, SF3) is directed in a direction concordant with that of the Coriolis force.

In practice, in each drive half-period, the spurious vibration is concordant with the sense movement in two movable masses and is discordant in the other two movable masses. The spurious vibration Lin Vibr may thus be sensed and canceled.

Therefore, the gyroscope G3 is resistant to linear vibrations.

FIG. 14G shows the same gyroscope G4 as FIG. 14F in the presence of rotational vibrations Rot Vibr.

Also here, the Coriolis forces acting on the external movable masses M1, M4 (arrows Co1, Co4) are directed in a mutually concordant direction that is opposite to the Coriolis forces acting on the central movable masses M2, M3 (arrows Co2, Co3). Here the spurious rotational vibration (arrow Rot Vibr) gives rise to spurious forces SF1-SF4 which tend to cause the gyroscope G3 to rotate around its own barycenter O and therefore have opposite directions on the two sides of the barycenter O. In practice, the spurious forces SF1, SF2 acting on the first and the second movable masses M1, M2 (first pair) are opposite to the spurious forces SF3, SF4 acting on the third and fourth movable masses M3, M4 (second pair).

Consequently, the movable masses M1-M4 have Coriolis forces and spurious forces acting differently on the different movable masses M1-M4. For example, in FIG. 14G, on the first and the third movable masses M1, M3, the acting forces (Co1, SF1; Co3, SF3) have opposite direction; on the second and the fourth movable masses M2, M4, the acting forces (Co2, SF2; Co4, SF4) have concordant direction.

Due the different behavior of the movable masses M1-M4, the movement caused by the Coriolis force may be distinguished from the movement caused by the rotational vibration Rot Vibr.

Consequently, the gyroscope G4 is also resistant to rotational vibrations.

Figure 15:
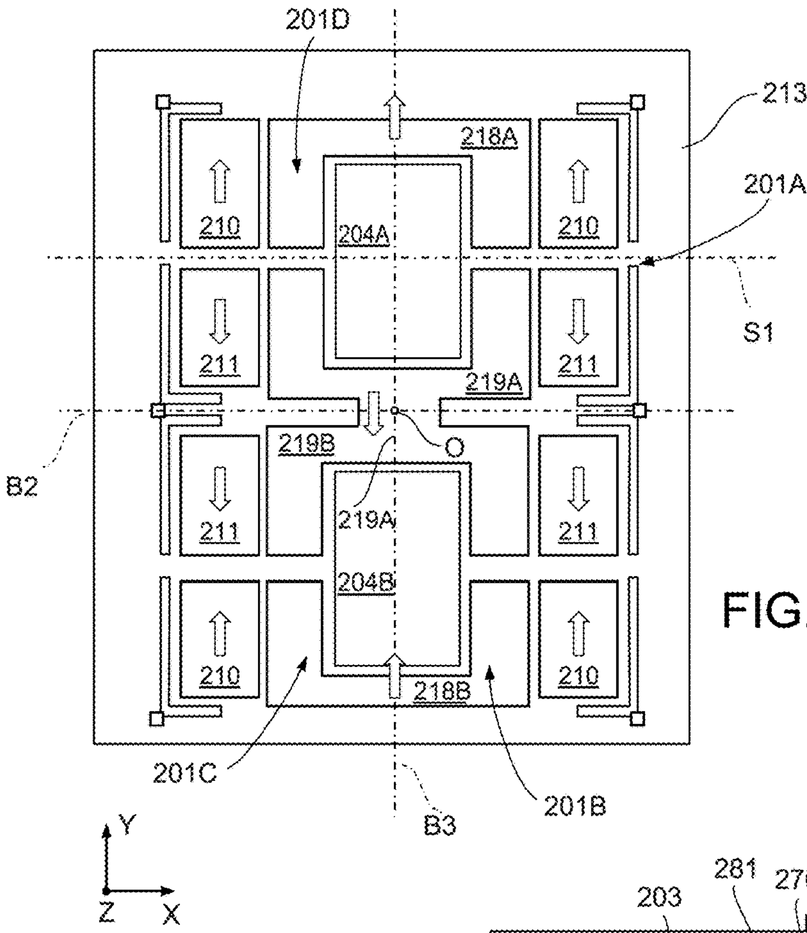
FIG. 15 is a schematic top view of a gyroscope using the principle illustrated in FIGS. 14D-14F.

FIG. 15 shows a gyroscope 200 operating according to the principle shown in FIGS. 14D, 14E.

The gyroscope 200 is of MEMS type, and has a substantially planar structure with greater dimensions directed parallel to a first horizontal axis X and to a second horizontal axis Y of an inertial reference system XYZ having a vertical axis Z.

The gyroscope 200 has a symmetrical structure with respect to a second and a third barycentric axis B2, B3 parallel to the first and, respectively, to the second horizontal axis X, Y, but is configured to be driven as described with reference to FIGS. 14D, 14E.

In detail, the gyroscope 200 comprises four elementary structures 201. In order to distinguish them, the four elementary structures 201 are also referred to as first, second, third and fourth elementary structures 201A, 201B, 201C and 201D (clockwise in FIG. 15, with the first elementary structure 201A at the top right of FIG. 15).

Figure 16:
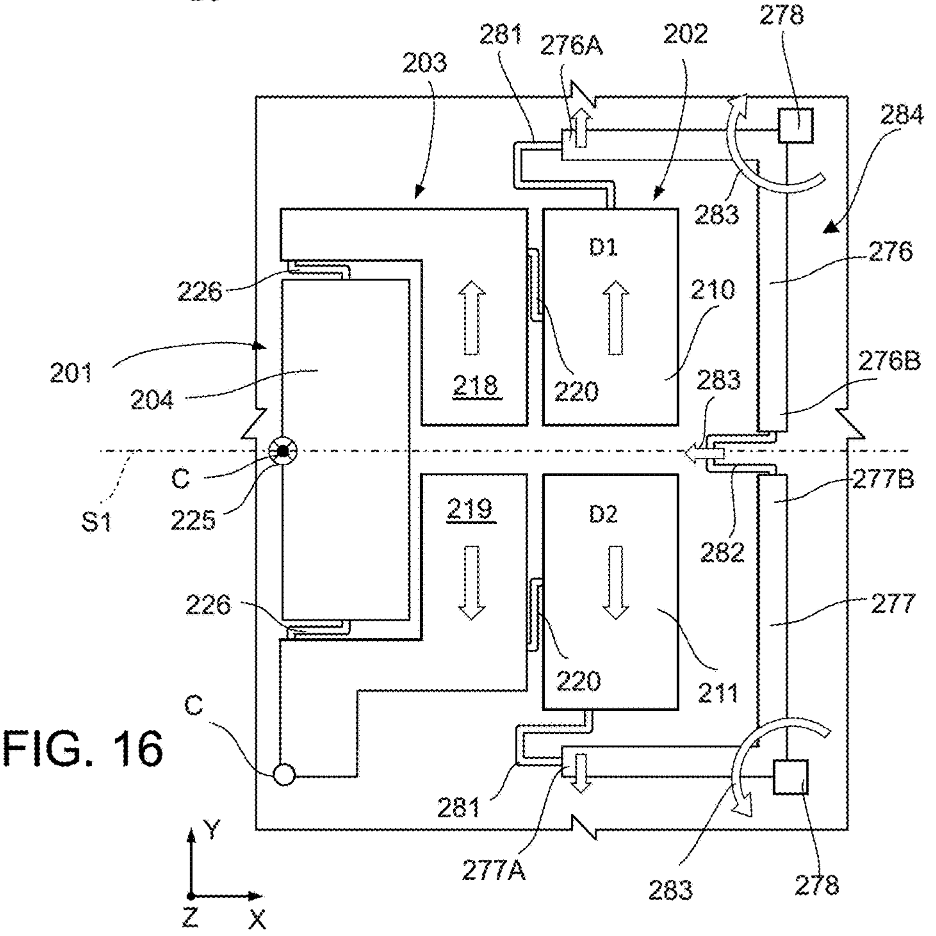
FIG. 16 shows an enlarged view of the elementary structure of the gyroscope of FIG. 15, with a representation of the movements in drive mode.

With reference also to FIG. 16, showing for example the first elementary structure 201A, each elementary structure 201 comprises a drive structure 202; a Coriolis structure 203 and a sense mass 204.

The drive structure 202 comprises two frames 210, 211 configured to generate drive forces directed in opposite directions, here parallel to the second horizontal axis Y.

In each drive structure 202, the two frames 210, 211 are arranged adjacent in a direction parallel to the second horizontal axis Y, the first frame 210 arranged farther and the second frame 211 arranged closer to the second barycentric axis B2 of the gyroscope 200.

The Coriolis structure 203 of each elementary structure 201 comprises two Coriolis masses 218, 219 arranged adjacent in a direction parallel to the second horizontal axis Y.

Hereinafter, the Coriolis mass 218 of each elementary structure 201 arranged farther from the second barycentric axis B2 of the gyroscope 200 is also referred to as first Coriolis mass 218 and the Coriolis mass 219 of each elementary structure 201 arranged closer to the second barycentric axis B2 of the gyroscope 200 is also referred to as second Coriolis mass 219.

The first Coriolis mass 218 is coupled to the first frame 210; the second Coriolis mass 219 is coupled to the second frame 211. The Coriolis masses 218, 219 are coupled to the respective frames 210, 211 through second springs 220.

The second springs 220 are rigid in the drive direction (parallel to the second drive axis Y) so as to pull the respective Coriolis masses 218, 219 in movement in the drive mode. However, the second springs 220 are compliant in the sense direction, as discussed below with reference to FIGS. 17 and 18.

In FIG. 15, the Coriolis masses 218, 219 of the elementary structures 201 are approximately L-shaped, and the Coriolis masses 218, 219 of two elementary structures 201 adjacent in a direction parallel to the first horizontal axis X (pairs of elementary structures 201A/201C and 201B/201C) are joined so as to have an overall C shape similar to that of the gyroscope 1 of FIGS. 1-4 (common Coriolis masses, indicated where useful by 218A, 218B, 219A, 219B).

In practice, in the gyroscope 200 of FIGS. 15, 16, each pair 201A/201C and 201B/201C of elementary structures has a substantially symmetrical structure with respect to a symmetry axis S1 parallel to the first horizontal axis X, which also represents a barycentric axis for each sense mass 204 and hereinafter is therefore also referred to as barycentric sense axis S1. The first Coriolis masses 218 and the first frames 210 are arranged on one side of symmetry axis S1; the second Coriolis masses 218 and the second frames 211 are arranged on an opposite side of symmetry axis S1. In practice, symmetry axis S1 here also forms a barycentric axis for each pair 201A/201C and 201B/201C of elementary structures.

The first Coriolis masses 218 of the pairs of elementary structures 201A/201C and 201B/201C therefore have the same drive movement (i.e., they all move in the same direction and with the same phase); similarly, the second Coriolis masses 219 of the pairs of elementary structures 201A/201C and 201B/201C all move in the same manner, that is in the same direction and with the same phase, but in phase opposition with respect to the first Coriolis masses 218.

Since the second Coriolis masses 219 (closer to the second barycentric axis B2 of the gyroscope 200) move in a concordant manner, they are monolithic herein.

If allowed by the geometry, also the second drive frames 211 (which generate, as mentioned, a concordant drive movement) might be joined to each other, that is the gyroscope 200 might have a second common drive frame 211 coupled to the second common Coriolis mass 219.

In this manner a high movement symmetry is obtained.

Furthermore, here, the sense mass 204 is shared between the two elementary structures of each pair 201A/201C, 201B/201C so that the gyroscope 200 of FIG. 15 comprises two sense masses, referred to (where useful for understanding) as first sense mass 204A, common to the first and the fourth elementary structures 2021A, 201D, and second sense mass 204B, common to the second and the third elementary structures 2021B, 201C.

In practice, each sense mass 204A, 204B is arranged between a first common Coriolis mass 218A, resp. 218B and a respective second common Coriolis mass 219A, resp. 219B.

The sense masses 204A, 204B are coupled to the Coriolis masses 218, 219 through third springs 226.

The third springs 226 are compliant in drive direction (parallel to the second drive axis Y), so as to decouple the Coriolis masses 218, 219 from the respective sense mass 204 in drive mode, and are rigid in sense direction, so as to transfer the sense movement of the Coriolis masses 218, 219 to the respective sense masses 204, as explained below with reference to FIGS. 17 and 18.

The sense masses 204 are anchored to the support 213 in a central position through respective sense elastic anchoring systems 225 which are shown schematically in FIG. 16 and allow rotation of each sense mass 204 around respective barycentric axes (central axes C, parallel to the vertical axis Z).

FIG. 16 also shows an elastic structure 284 which couples the frames 210, 211 of the first elementary structure 201A to each other and to the support 213. Similar elastic structures 284 are also provided for the elementary structures 201B-201D, as schematically shown in FIG. 15.

In detail, the elastic structure 284 comprises a first rocker element 276 and a second rocker element 277. The rocker elements 276, 277 are hinged to the support 213 at hinge points 278 and may rotate around axes directed parallel to the vertical axis Z and passing through the same hinge points 278.

The rocker elements 276, 277 are L-shaped having a first portion 276A, resp. 277A, and a second portion 276B, resp. 277B.

The first portion 276A, 277A is coupled to the first frame 210, resp. to the second frame 211 through fifth springs 281. The second portions 276B, 277B are coupled to each other through a sixth spring 282.

The fifth springs 281 are rather rigid, so as to transfer the drive movement of the frames 210, 211 to the first portions 276A, resp. 277A of the rocker elements 277, 278, while the sixth spring 282 is compliant in the plane, as indicated below.

The gyroscope 200 of FIG. 15 may operate for sensing yaw or pitch movements, as described hereinafter with reference to FIGS. 16-18, wherein a single elementary structure 201 is shown. In particular, FIG. 16 shows the forces (accelerations) acting on the elementary structure 201 in drive mode; FIG. 17 shows the forces acting on the elementary structure 201 in yaw sense mode; and FIG. 18 shows the forces acting on the elementary structure 201 in pitch sense mode.

With reference to FIG. 16 and as indicated above, in the drive mode, the frames 210, 211 of the elementary structure 201 are operated in opposite directions, parallel to the second horizontal axis Y. The frames 210, 211 move with alternate linear motion, in phase opposition, and move away from and towards each other at each half-period of the drive signals, as indicated by arrows D1, D2, directed in opposite directions.

During the drive movement, the elastic structures 284 rotate and deform, so as to couple the movements of the frames 210, 211 of each elementary structure 201.

In detail, when the frames 210, 211 move in the drive directions D1, D2, they act on the first portions 276A, resp. 277A of the rocker elements 277, 278, causing them to rotate in opposite directions around the respective hinge points 278, as indicated by arrows 283.

Consequently, the second portions 276B, 277B also rotate, causing a deformation and displacement of the sixth spring 282, according to arrow 284.

In the drive mode shown in FIG. 16, the Coriolis masses 218, 219 are pulled by the frames 210, 211 in opposite directions, being coupled thereto by the second springs 220, but the sense mass 204 is stationary, being constrained to the support 213 (as to the translation) and decoupled from the Coriolis masses 218, 219 through the third springs 226, which deform.

Figure 17:
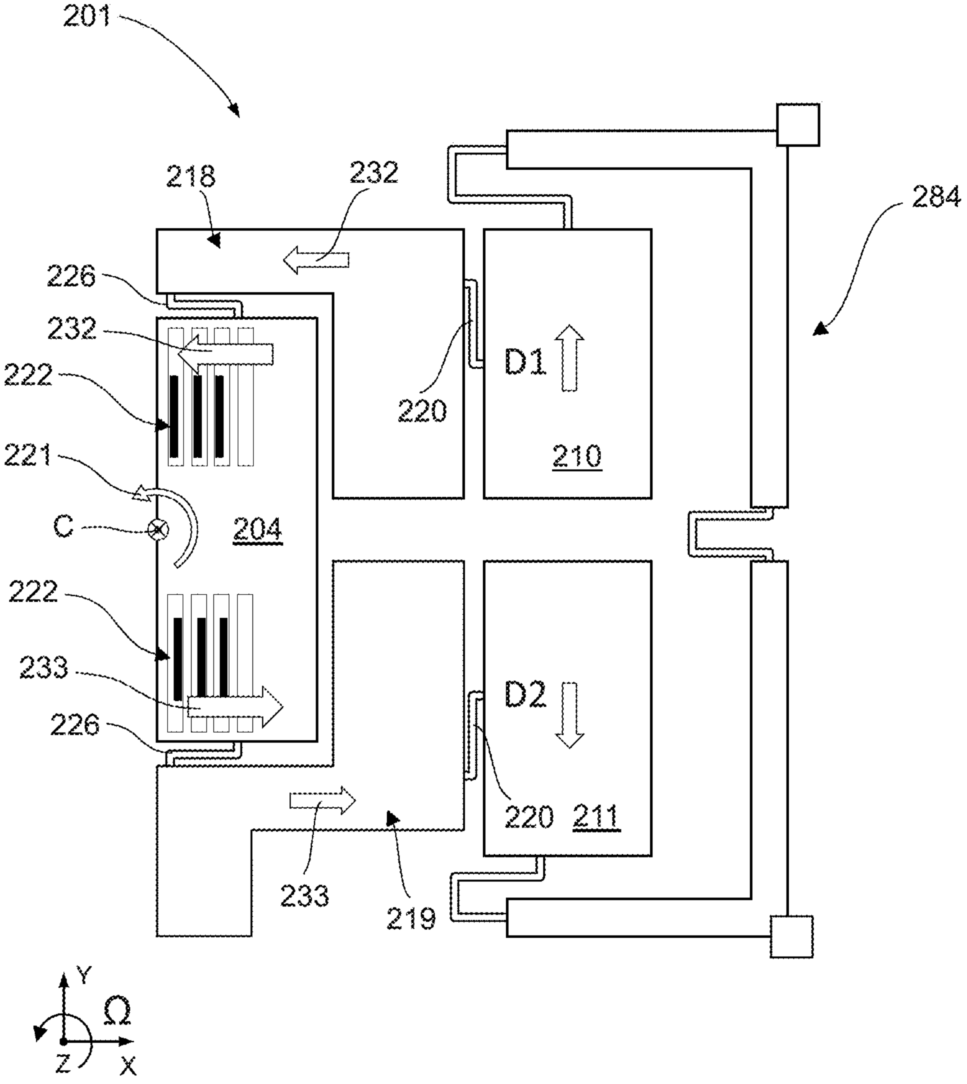
FIG. 17 shows the elementary structure of FIG. 16, with a representation of the movements, in yaw sense mode.

FIG. 17 shows the gyroscope 200 in yaw sense mode. In this condition, it is responsive to accelerations caused by an angular speed Ω directed around the vertical axis Z.

In detail, in this case, the second springs 220 are configured to yield in a direction parallel to the first horizontal axis X (sense axis) and the third springs 226 are configured to be substantially rigid in this direction.

Here, a rotation of the gyroscope 200 around the vertical axis Z, in presence of the drive movement shown in FIG. 16, due to the Coriolis effect, generates accelerations, on the Coriolis masses 218, 219, which are directed parallel to the first horizontal axis X, but in opposite directions (arrows 232, 233). The Coriolis masses 218, 219 thus move (in a first approximation) parallel to the first horizontal axis X, in opposite directions.

The opposite movement of the Coriolis masses 218, 219 causes the rotation of the sense mass 204 around its own central axis C, as shown by arrow 221.

The rotation of the sense mass 204 may be sensed through position sense structures (indicated in FIG. 17 by 222), which generate corresponding measurement signals which vary based on the distance variation between the sense mass 204 and fixed electrodes facing it (distance variation in a direction parallel to the first horizontal axis X, indicated by arrows 223. Processing circuits (for example as described with reference to FIGS. 10-13) allow the rotation angle of the sense mass 204 to be calculated.

Figure 18:
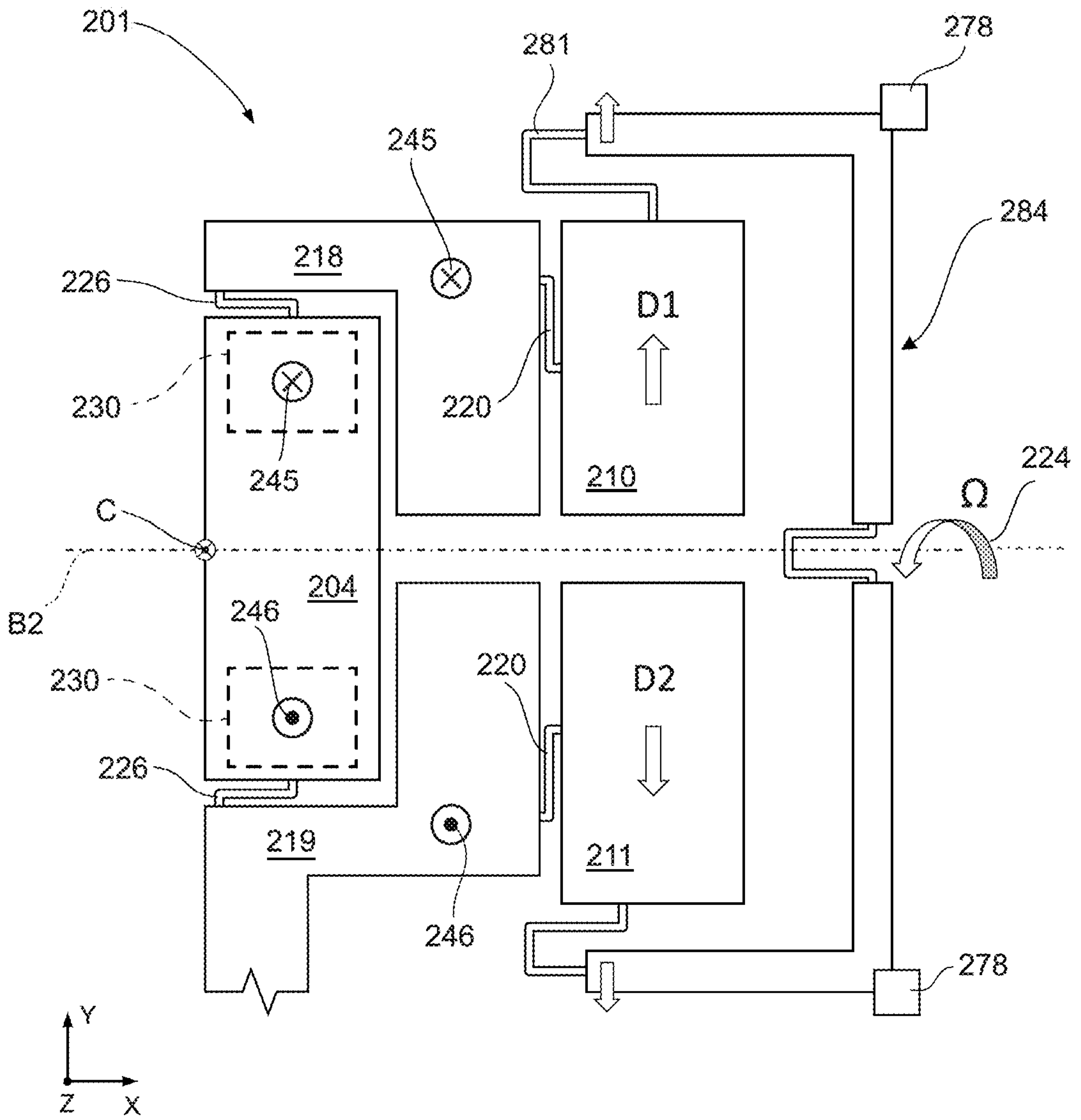
FIG. 18 shows the elementary structure of FIG. 16, with a representation of the movements, in pitch sense mode.

FIG. 18 shows the gyroscope 200 in pitch sense mode. In this condition, it is responsive to accelerations caused by angular speeds Ω directed around the first horizontal axis X (as represented by arrow 224) and may sense the value thereof.

In detail, in this case, the second springs 220 are configured to yield in a direction parallel to the vertical axis Z and the third springs 226 are configured to be substantially rigid in this direction.

Consequently, in presence of an angular speed Ω directed around the first horizontal axis X, the Coriolis force causes the rotation of the Coriolis masses 218, 219 around symmetry axis S1 (being, as indicated above, also a barycentric axis for each pair 201A/201C and 201B/201C of elementary structures).

In particular, in each elementary structure 201, one of the Coriolis masses (in FIG. 18, the first Coriolis mass 218) rotates away from the observer (symbol X, 245) and the other Coriolis mass (in FIG. 18, the second Coriolis mass 219) rotates towards the observer (symbol ●, 246).

The sense mass 204 rotates in the same direction, due to the coupling with the Coriolis masses 218, 219 through the third springs 226.

Position sense structures (indicated schematically by 230 in FIG. 18), for example arranged below the sense mass 204, on two opposite sides with respect to the barycentric sense axis S1, allow the rotation of the sense mass 204 to be measured based on the distance variation between the latter and fixed electrodes facing it (distance variation in a direction parallel to the first horizontal axis X, indicated by arrows 223).

In practice, the elementary structure 201 of FIG. 18 behaves as described above with reference to FIGS. 14B, 14C and therefore is resistant to liner vibrations, but not to rotational vibrations.

Conversely, the gyroscope 200 of FIG. 15, in each vertical half (elementary structures 201A/201B and 201C/201D) behaves as described with reference to FIGS. 14D-14G, therefore it is resistant to both linear and rotational vibrations.

Figure 19:
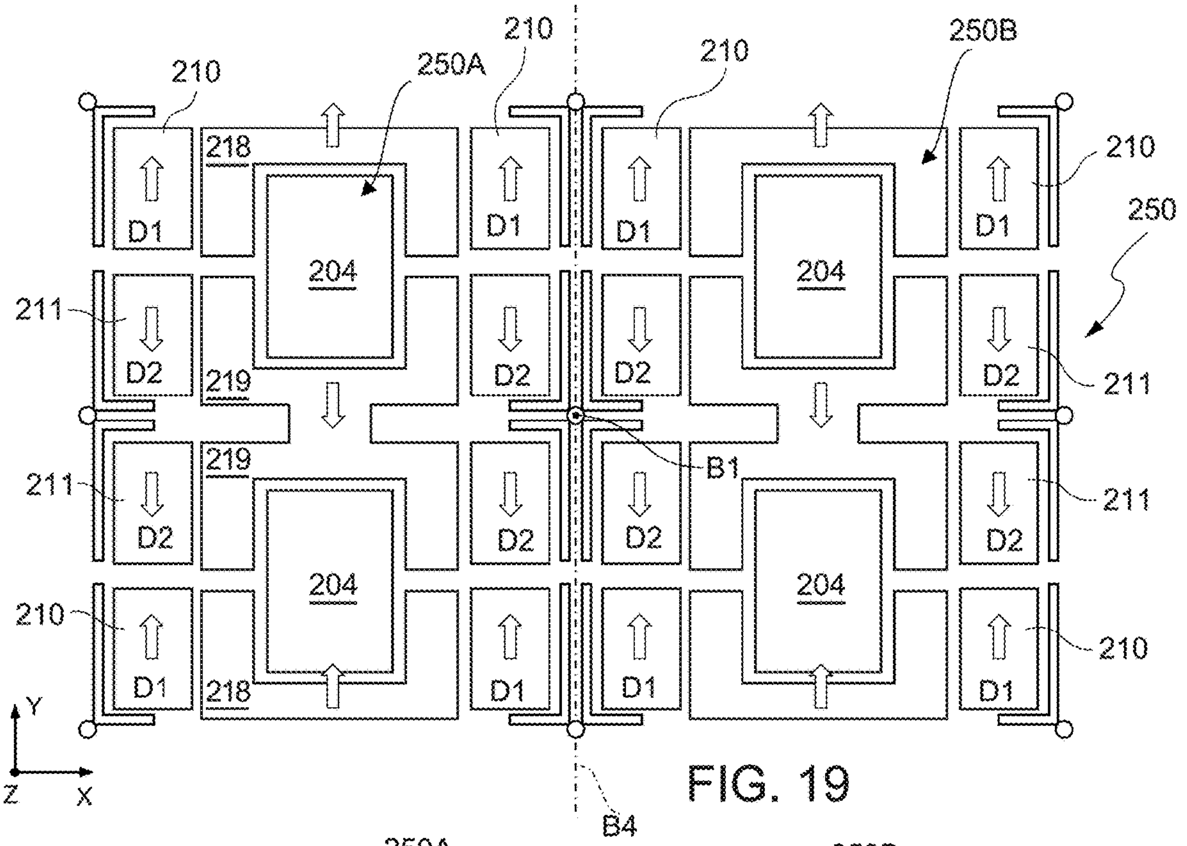
FIG. 19 is a schematic top view of a yaw and pitch biaxial gyroscope, incorporating the elementary structures shown in FIGS. 17 and 18, with a representation of the movements in drive mode.
Figure 20:
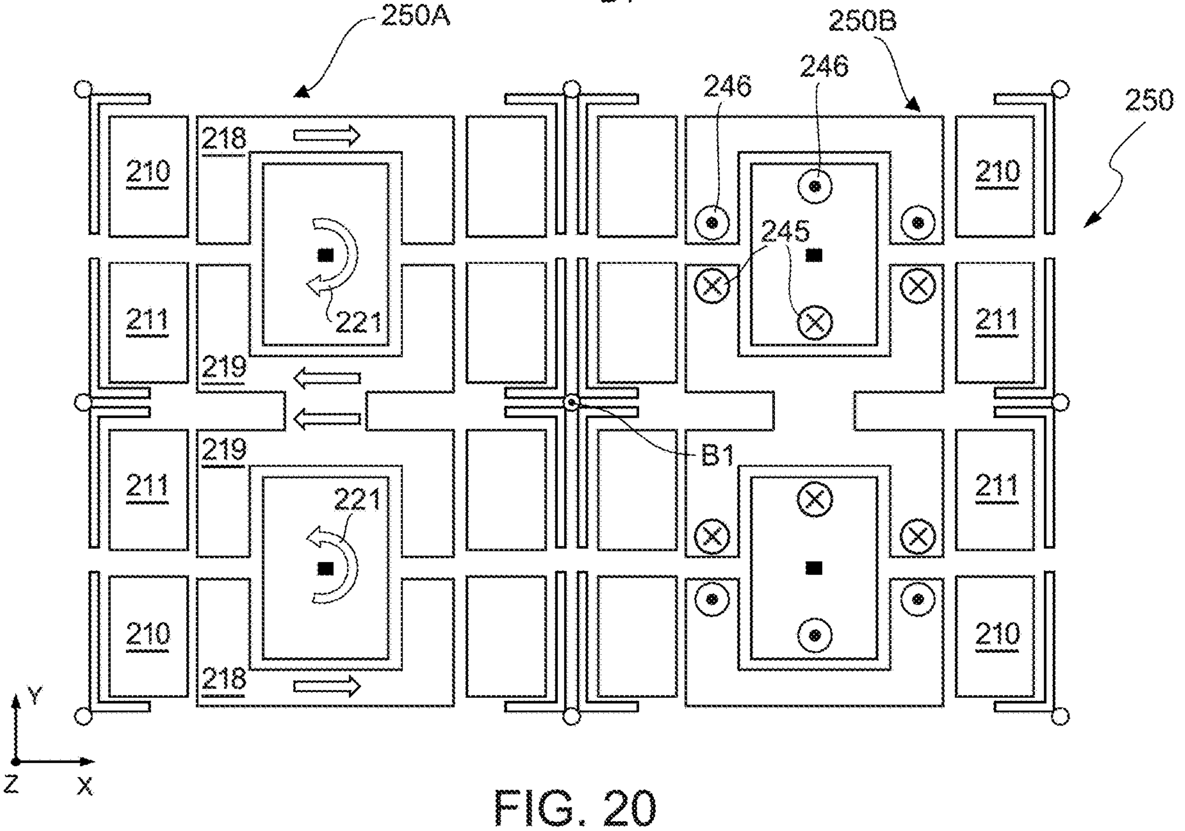
FIG. 20 is a schematic top view of the gyroscope of FIG. 19, with a representation of the movements in sense mode.

FIGS. 19 and 20 show a gyroscope 250 of biaxial type, configured to sense both yaw and pitch movements.

In particular, the gyroscope 250 has a center axis B4, parallel to the second horizontal axis Y, which divides the gyroscope 250 into a left half 250A (intended to sense yaw movements) and a right half 250B (intended to sense pitch movements).

As noted, the left half 250A and the right half 250B have a similar general structure and are driven in the same manner.

In particular, as already discussed above with reference to FIGS. 15-18 and as represented by arrows D1, D2 in FIG. 19 (showing the drive mode), the frames 218, 219 move completely symmetrically in the left half 250A and in the right half 250B.

Conversely, due to the different configurations of the second and the third springs 220, 226 (as explained above with reference to FIGS. 16-18) and as shown in FIG. 20 (showing the sense mode), the Coriolis masses 218, 219 and the sense masses 204 move differently in the two halves 250A, 250B.

In particular, the left half 250A rotates as represented by arrows 221, as described with reference to FIG. 17, and the right half 250B rotates as represented by the symbols 245, 246, as described with reference to FIG. 18.

Since the gyroscope 250 of FIGS. 19 and 20 is based on the structure shown and described in FIGS. 14D-14G, it is resistant to both linear and rotational vibrations.

Figure 21:
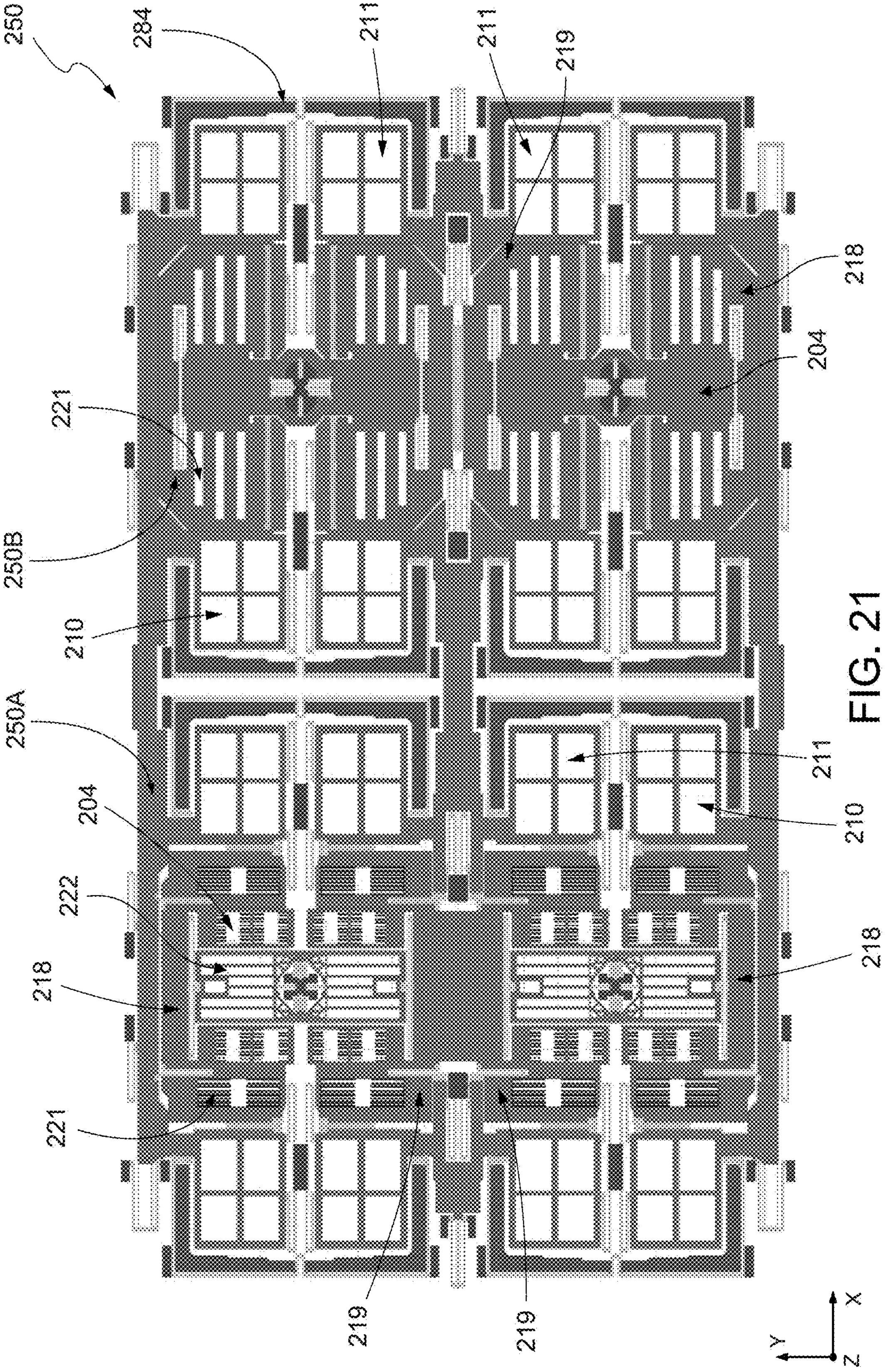
FIG. 21 shows a possible implementation of the gyroscope of FIGS. 19-20.

A possible implementation of the gyroscope 250 of FIG. 20 is shown in FIG. 21, wherein quadrature compensation structures 221 are also visible as well as the sense structures 222 in the left half 250A.

Figure 22:
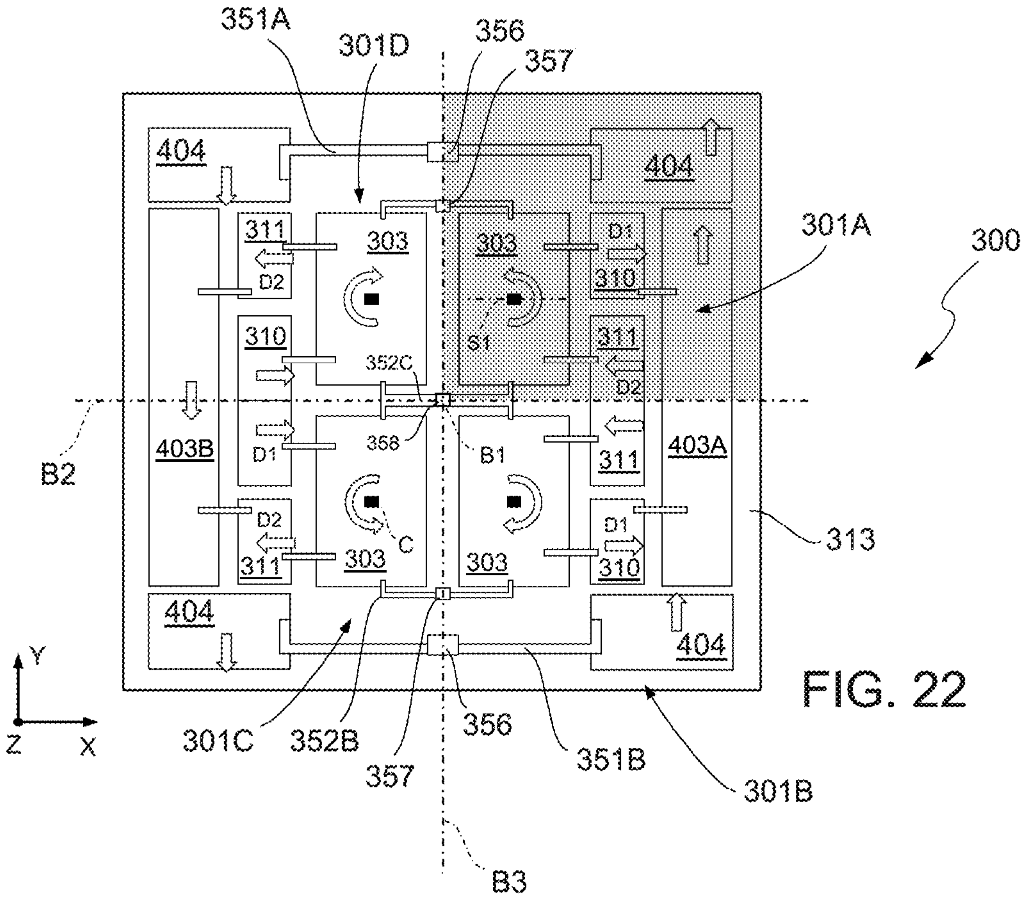
FIG. 22 is a schematic top view of another biaxial-type gyroscope, with a representation of the movements in drive mode.

FIG. 22 shows a principle diagram of a gyroscope 300 of biaxial type, capable of sensing yaw and roll movements by an elementary structure having a drive portion, a yaw sense portion and a roll sense portion.

Since, each elementary structure has sense portions for two different movements, these portions are active in an alternative manner, according to the instant rotational field applied to the gyroscope 300.

In detail, the gyroscope 300 is of MEMS type and has a substantially planar structure with greater dimensions parallel to a first horizontal axis X and to a second horizontal axis Y of an inertial reference system XYZ.

The gyroscope 300 has a first barycentric axis B1 parallel to a vertical axis Z of the inertial reference system XYZ and comprises four elementary structures 301 arranged symmetrically with respect to a second and a third barycentric axis B2, B3 parallel, respectively, to the first and the second horizontal axis X, Y. In order to distinguish them, the four elementary structures 301 are also referred to as first, second, third and fourth elementary structures 301A, 301B, 301C and 301D (clockwise in FIG. 22, with the first elementary structure 301A at the top right of FIG. 22).

Figure 23A:
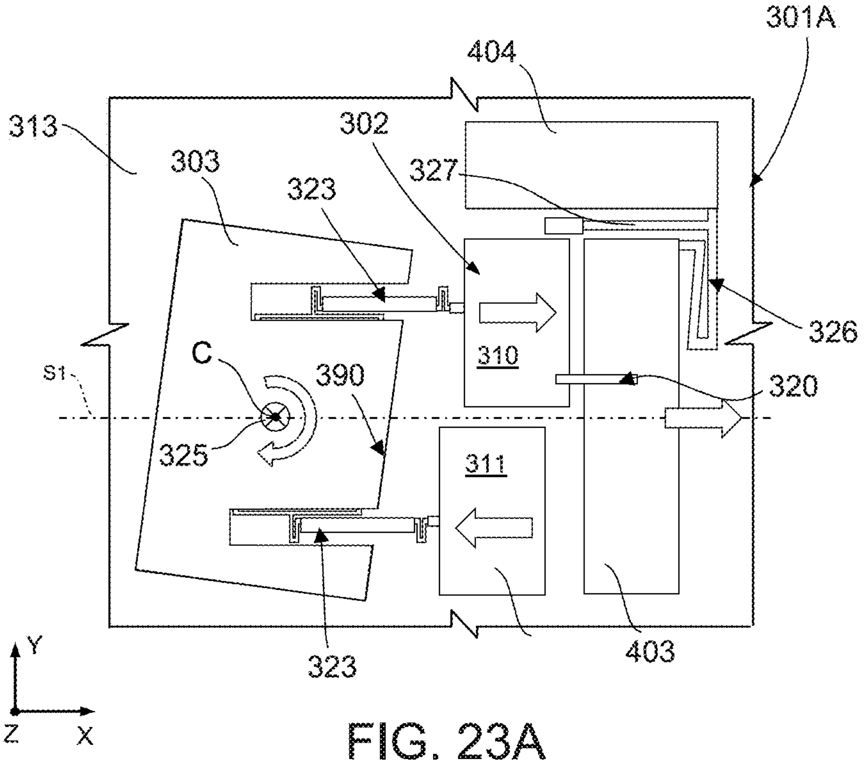
FIG. 23A shows an enlarged view of the elementary structure of the gyroscope of FIG. 22, with a representation of the elastic couplings and of the drive movements.

With reference also to FIG. 23A, showing for example the first elementary structure 301A, each elementary structure 301 comprises a drive portion 302; a roll sense mass 303, a Coriolis mass 403 and a yaw sense mass 404.

The roll sense mass 303 is the roll sense portion; the Coriolis mass 403 and the yaw sense mass 404 are the yaw sense portion; and the drive structure 302 is common to both the roll sense portion (303) and the yaw sense portion (403, 404).

The drive structure 302 of each elementary structure 301 comprises two drive assemblies 310, 311 configured to translate along opposite drive directions, alternately and in phase opposition to each other, along a drive axis, here parallel to the first horizontal axis X; the drive assemblies 310, 311 are here arranged side by side to each other parallel to the second horizontal axis Y.

Furthermore, here the drive assemblies 310, 311 of adjacent elementary structures 301A and 301D or 301B and 301C, are operated in phase opposition, as shown by arrows D1, D2 of FIG. 22 and explained below.

The roll sense mass 303 is here centrally anchored through a first sense anchoring system 325 which allows the rotation thereof around an own central axis C. The roll sense mass 303 is also directly coupled to the drive structure 302 through coupling elastic systems 323 which, in drive mode, couple the drive structure 302 to the roll sense mass 303 and cause the alternate rotation of the latter around its central axis C.

In the embodiment shown, the roll sense mass 303 has a rectangular shape, with a symmetry axis S1 parallel to the first horizontal axis X and a drive side 390 perpendicular to symmetry axis S1 and facing the drive structure 302.

In particular, the roll sense mass 303 is coupled to the first and the second drive assemblies 310, 311 at two portions thereof arranged on opposite sides with respect to symmetry axis S1 (in FIG. 23A, above and, respectively, below symmetry axis S1) so that the opposite movement of the drive assemblies 310, 311 determines the alternate drive rotation thereof.

The coupling elastic systems 323 are therefore substantially rigid in the drive direction (parallel to the first horizontal axis X), but are compliant in a direction parallel to the vertical axis Z, to allow the roll movement, as explained below with reference to FIG. 25.

The Coriolis mass 403 here extends laterally to the drive structure 302, on one side thereof opposite to the roll sense mass 303.

The Coriolis mass 403 here has a generally rectangular shape elongated parallel to the second horizontal axis Y and is coupled to one of the two drive assemblies 310, 311 (in FIGS. 22, 23A, 23B, to the first drive assembly 310) through drive springs 320 rigid in the drive direction (parallel to the first horizontal axis X), but compliant in the planar direction perpendicular to the drive direction (here, parallel to the second horizontal axis Y).

In this manner, the Coriolis mass 403 is actuated so as to move (in drive mode) parallel to the first horizontal axis X, together with one of the two drive assemblies 310, 311, but it may move in a perpendicular direction (in sense mode) parallel to the second horizontal axis Y, as explained below with reference to FIG. 25.

The yaw sense mass 404 is coupled to the Coriolis mass 403 through a sense spring system 326 which decouple the yaw sense mass 404 from the Coriolis mass 403 in drive mode (in drive direction, here parallel to the first horizontal axis X), but couple the masses 403, 404 in yaw sense mode (rotation of the gyroscope 300 around the barycentric axis B1 300, as explained below with reference to FIG. 25).

The sense spring system 326 also couples the yaw sense mass 404 to a second sense anchoring system 327 integral with a support 313, for example a semiconductor substrate, and compliant in sense direction (here parallel to the second horizontal axis Y).

In the gyroscope 300 of FIG. 22, the Coriolis mass 403 of the first elementary structure 301A is joined to the Coriolis mass 403 of the second elementary structure 301B to form a first common Coriolis mass 403A; similarly, the Coriolis mass 403 of the third elementary structure 301C is joined to the Coriolis mass 403 of the fourth elementary structure 301D to form a second common Coriolis mass 403B.

Furthermore, the yaw sense masses 404 are here coupled two by two through first bridge elements 351A, 351B, extending between the first and the fourth elementary structures 301A, 301D, respectively between the second and the third elementary structures 301B, 301B.

The first bridge elements 351A, 351B extend here parallel to the first horizontal axis X and are anchored to the support 313 in respective first bridge anchors 356.

Furthermore, the roll sense masses 303 are here coupled two by two through second bridge elements 352A, 352B extending between the first and the fourth elementary structures 301A, 301D, respectively between the second and the third elementary structures 301B, 301B, on external sides of these elementary structures 301A-301D, remote to the second barycentric axis B2 of the gyroscope 300.

The second bridge elements 352A, 352B extend here parallel to the first horizontal axis X and to the first bridge elements 351A, 351B and are anchored to the support 313 at respective second bridge anchors 357, arranged in a central position.

Furthermore, the roll sense masses 303 are all coupled by a central bridge element 352C, extending parallel to the first horizontal axis X, along the second barycentric axis B2 of the gyroscope 300.

The central bridge element 352C is also anchored to the support 313 in a third bridge anchor 358, at the first barycentric axis B1.

In practice, the first elementary structure 301A and the fourth elementary structure 301D form a pair of elementary structures 301A/301D; the same for the second and the third elementary structure 301D (pair 301B/301C).

In this manner, as indicated above, here the drive assemblies 310, 311 of pairs 301A/301D and 301/301C of elementary structures 301 are operated in phase opposition, and cause a drive rotation of the respective roll sense masses 303 in opposite directions (so for example the first elementary structure 301A has a roll sense mass 303 having opposite drive rotation—in phase opposition—with respect to the fourth elementary structure 301D, in addition to the second elementary structure 301B; conversely it has a drive movement concordant—in phase—with the third drive structure 301C).

Figure 23B:
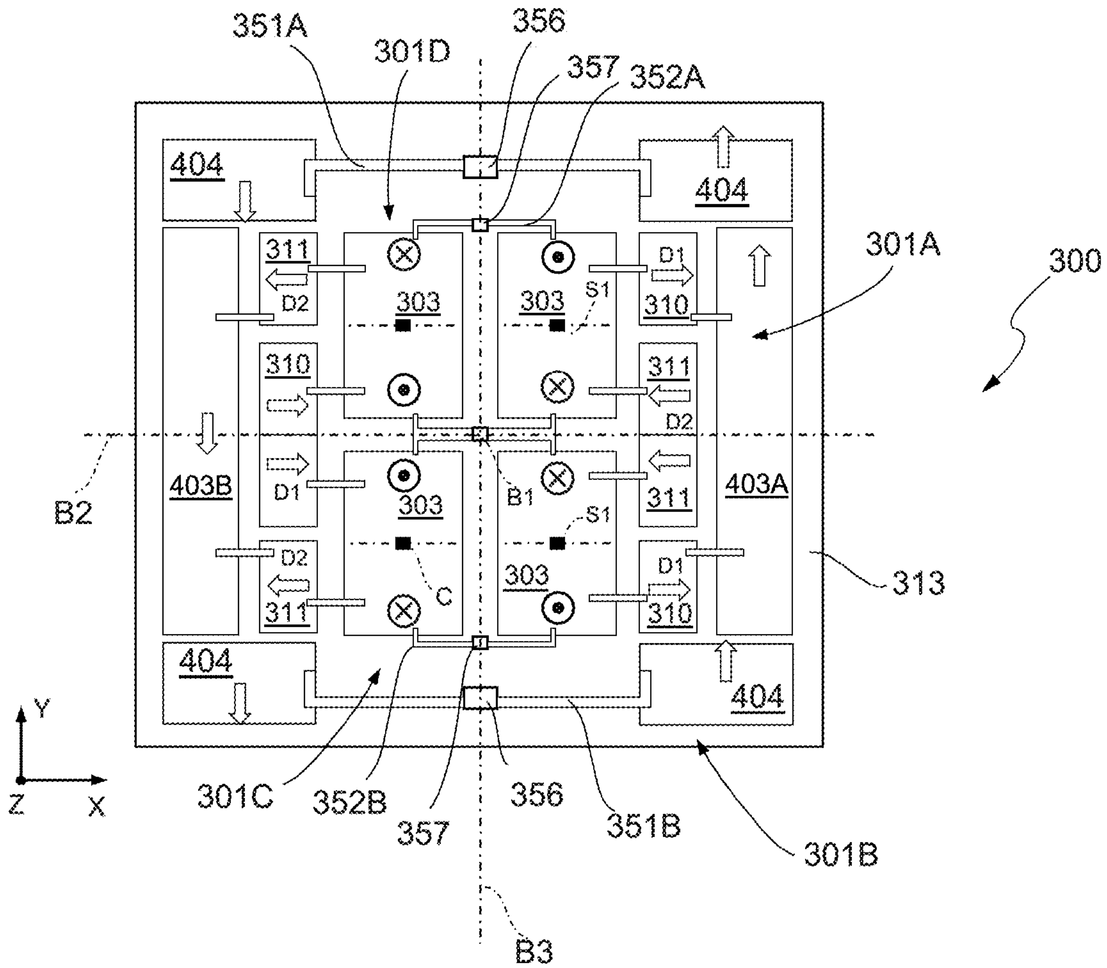
FIG. 23B is a schematic top view of the gyroscope of FIG. 22, with a representation of the movements in sense mode.

The gyroscope 300 of FIG. 22 may operate for sensing yaw and pitch movements. In particular, FIGS. 22 and 23A show the forces (accelerations) acting on the elementary structure 301A in drive mode; FIG. 23B shows the forces acting on the elementary structure 301 in yaw and pitch sense mode.

With reference to FIGS. 22, 23A and as indicated above, in the drive mode, the frames 310, 311 of each elementary structure 301 are operated in the opposite direction, parallel to the second horizontal axis Y. Furthermore, the first frames 310 of each pair of elementary structures 301A/301D, 301B/301D are operated in the opposite direction. The frames 310, 311 move with alternate linear motion, in phase opposition, as indicated by arrows parallel to the first horizontal axis X in FIGS. 22, 23A.

The corresponding sense movements are indicated in FIG. 23B. In particular, as to the yaw movement, the first common Coriolis mass 403A translates parallel to the second horizontal axis Y in opposite directions (in counter-phase) with respect to the second common Coriolis mass 403A.

Furthermore, as to the roll movement, the roll sense masses 303 of pairs 301A/301D, resp. 301B/301C rotate around the respective symmetry axes S1 (parallel to the first horizontal axis X) in opposite directions (cross symbols and dot symbols), as the roll sense masses 303 on the two sides of the second barycentric axis B2, as described in detail below, with reference to FIGS. 24 and 25.

In sense mode, the first bridge elements 351A, 351*b* rotate around respective rotation axes parallel to the vertical axis Z and passing through the first bridge anchors 356, in the same direction (clockwise or counterclockwise).

Furthermore, the second bridge elements 352A, 352B and the central bridge element 352C rotate around a same rotation axis parallel to the second horizontal axis Y and passing through the bridge anchors 357, 358. In practice, the second bridge elements 352A, 352B rotate in a same direction to each other and in opposite direction to the central bridge element 352C, following the movement of the portions coupled thereto of the sense masses 303.

Figure 24:
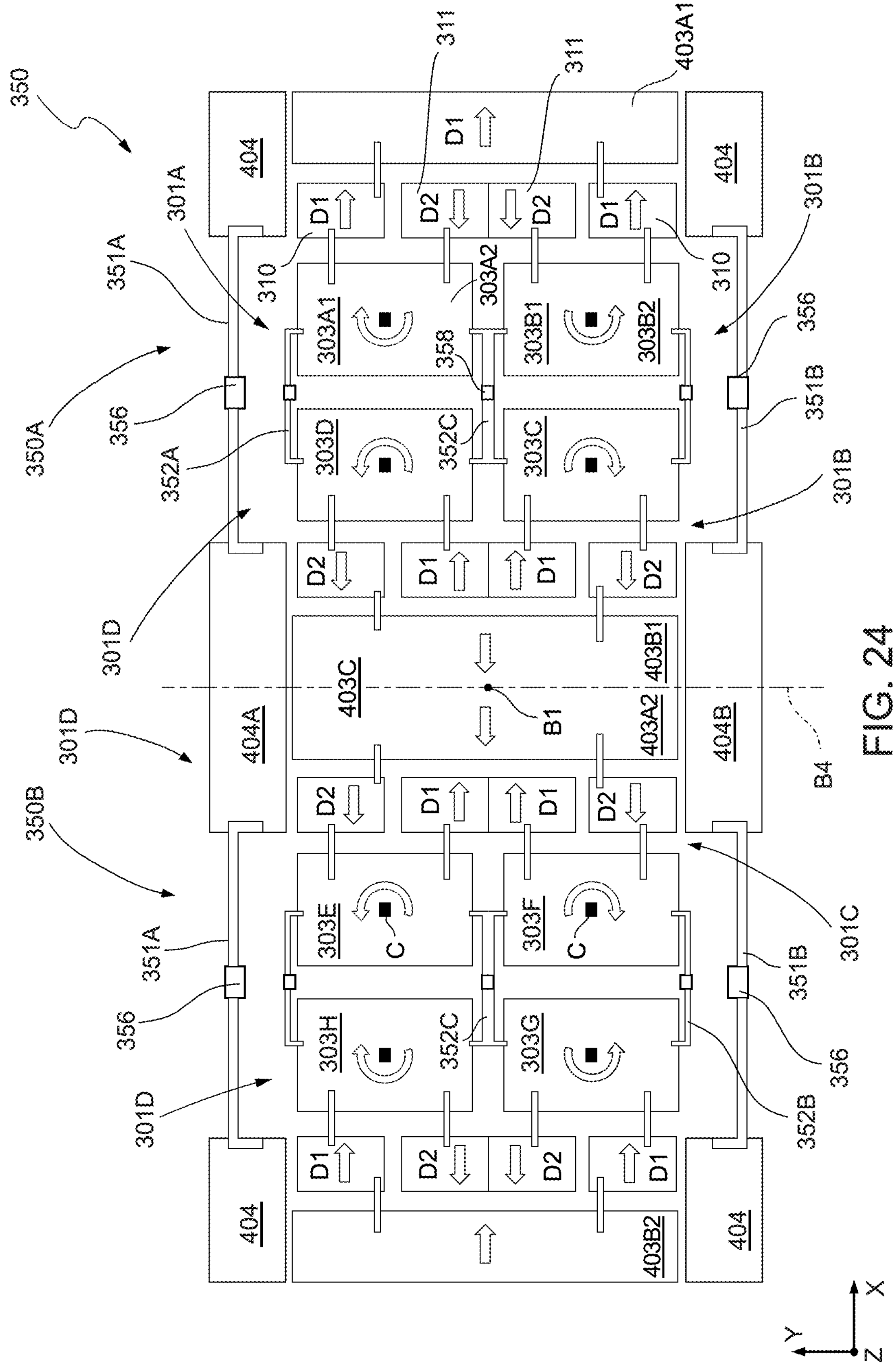
FIG. 24 is a schematic top view of a gyroscope based on the solution of FIG. 22, with a representation of the drive movements.
Figure 25:
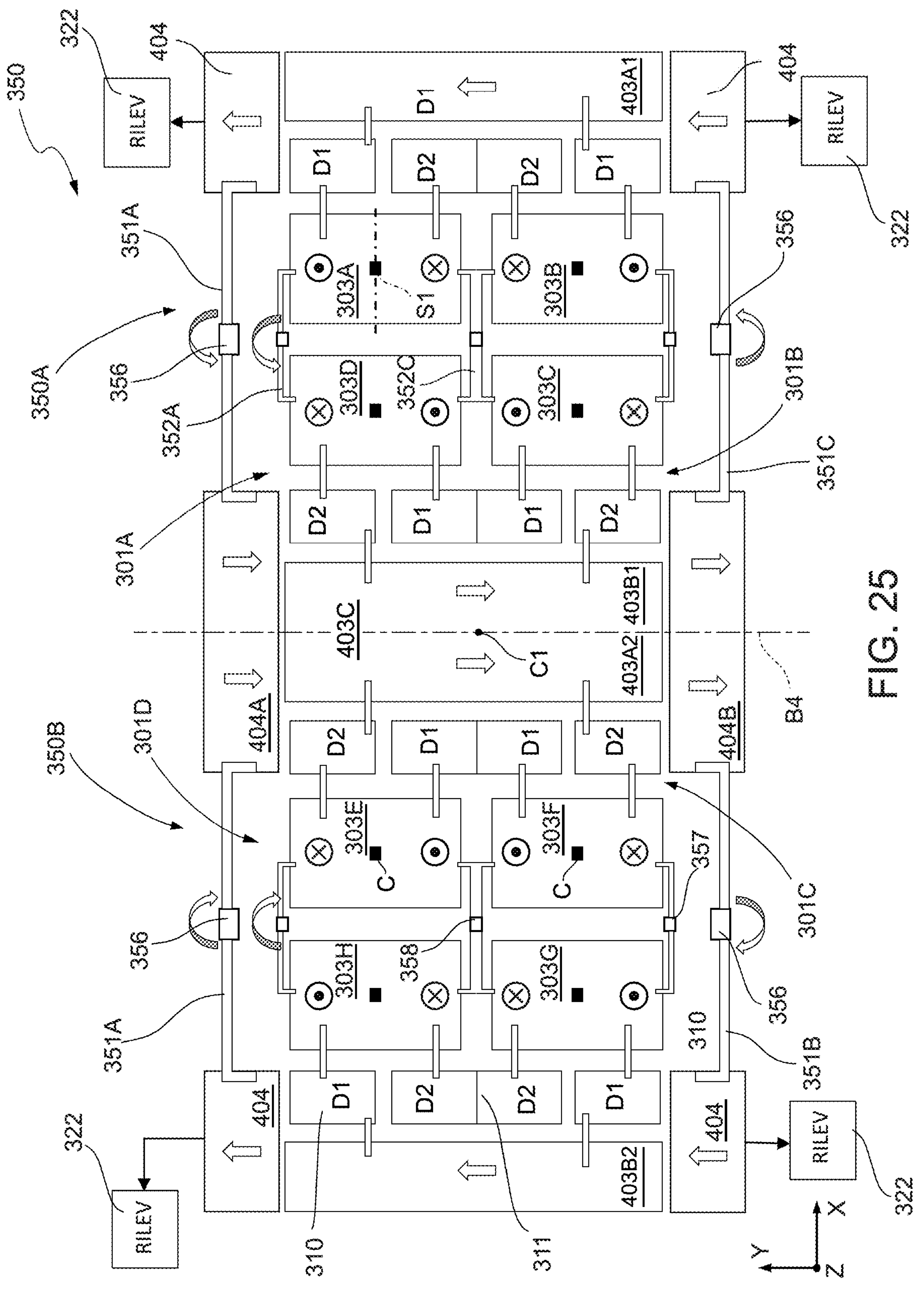
FIG. 25 is a schematic top view of the gyroscope of FIG. 24, with a representation of the yaw/roll sense movements.

FIGS. 24 and 25 show a gyroscope 350 of a MEMS, biaxial type, configured to sense yaw and roll movements and obtained by doubling the gyroscope 300 of FIG. 22.

In detail, the gyroscope 350 has a central axis B4, which is parallel to the second horizontal axis Y and divides the gyroscope 350 into a first and a second part 350A, 350B.

Here, the first and the second parts 350A, 350B have the same structure as the gyroscope 300 of FIG. 22. Consequently, like elements have been indicated using like numbers. However, where useful for understanding, the roll sense masses 303 are also identified as roll sense masses 303A-303H, wherein the sense masses 303A-303D are part of a respective elementary structure 301A-301D of the first part 350A and the sense masses 303E-303H form part, each, of a respective elementary structure 301A-301D of the second part 350B. Furthermore, for better understanding, the common Coriolis masses 403A, 403B are identified where useful also as first common Coriolis mass 403A1, resp. 403A2 and second common Coriolis mass 403B1, resp. 403B2, depending on whether they belong to the first, respectively, the second part 350A, 350B.

The two parts 350A, 350B of the gyroscope 350 are arranged side by side to each other along the first horizontal axis X and form a right half (here forming the first part 350A) and a left half (here forming the second part 350B), with the first and the second elementary structures 301A, 301B of the second part 350B (left half) adjacent and contiguous to the fourth and, respectively, third elementary structure 301D, 301C of the first part 350A (right half).

The gyroscope 350 is therefore not symmetrical with respect to the central axis B4 as regards driving (but it is as regards sensing, as discussed below).

As indicated above and shown in FIG. 24, the two parts 350A, 350B of the gyroscope 350 are driven in opposite manner, that is the drive assemblies 310, 311 of the first, second, third and fourth elementary structures 301A-301D in the two parts 350A, 350B have opposite movements (in phase opposition), as shown by arrows D1, D2 in FIG. 24. In this manner, the drive assemblies 310, 311 of adjacent elementary structures 301 (close to the central axis B4) are driven in phase.

Since the first common Coriolis mass 403A2 of the second part 350B is contiguous and driven in the same manner as the second common Coriolis mass 403B1 of the first part 350A (same drive movement), they move in the same manner also in sense mode; thus they are joined here to form a central sense mass 403C.

Similarly, the adjacent yaw sense masses 404 of the first and the second parts 350A, 350B of the gyroscope 350 may be joined to form central yaw sense masses 404A, 404B, coupled to opposite ends of the central Coriolis mass 403C. Alternatively, as in the implementation shown in FIG. 26, they may be maintained distinct.

Consequently, in drive mode, the central sense mass 403C oscillates, with translational motion parallel to the first horizontal axis X, in phase opposition (counter-phase) to the first common Coriolis mass 403A1 of the first part 350A and to the second common Coriolis mass 403B2 of the second part 350B, as shown by arrows D1, D2.

The yaw sense masses 404, on the other hand, are decoupled from the drive movement.

Furthermore, in drive mode, the roll sense masses 303 rotate around their own barycentric axes as explained above with reference to FIG. 23A; also here, due to the existing driving, the roll sense masses 303 of the two parts 350A, 350B of the gyroscope 350 do not rotate symmetrically. For example, the roll sense mass 303E (belonging to the first elementary structure 301A of the second part 350B) rotates in the same direction as the roll sense mass 303D (belonging to the fourth elementary structure 301D of the first part 350A and adjacent, along the first horizontal axis X, to the just-mentioned roll sense mass 303E); similarly, the roll sense mass 303F (belonging to the second elementary structure 301B of the second part 350B) rotates in the same direction as the roll sense mass 303C (belonging to the third elementary structure 301C of the first part 350A), and so on.

FIG. 25 shows the movements of the gyroscope 350 in sense mode, and precisely in presence of yaw and roll movements so that the movements shown for the roll sense masses 303, for the Coriolis masses 403 and for the yaw sense masses 404 generally do not occur simultaneously.

In detail, in presence of a yaw movement, the Coriolis masses 403 move as indicated in FIG. 25; then, the central Coriolis mass 403C translates parallel to the second horizontal axis Y (in FIG. 25, downwards), pulling the central yaw sense masses 404A, 404B in this direction; the first common Coriolis mass 403A1 of the first part 350A and the second common Coriolis mass 403B2 of the second part 350B translate in an opposite direction with respect to the central Coriolis mass 403C (in FIG. 25, upwards), pulling the yaw sense masses 404 coupled thereto in the same direction.

In this movement, due to the opposite translation directions of the Coriolis masses 403A1, 403B2 with respect to the central Coriolis mass 403C (and therefore of the respective yaw sense masses 404), the first bridge elements 351A, 351B rotate around axes passing through the respective first bridge anchors 356 and parallel to the vertical axis Z, as shown in FIG. 25.

In particular, the first bridge elements 351A, 351B of the first part 350A (on the right) both turn in one direction (in FIG. 25, counterclockwise) and the first bridge elements 351A, 351B of the second part 350B (on the left) both turn in the opposite direction (in FIG. 25, clockwise).

Figure 26:
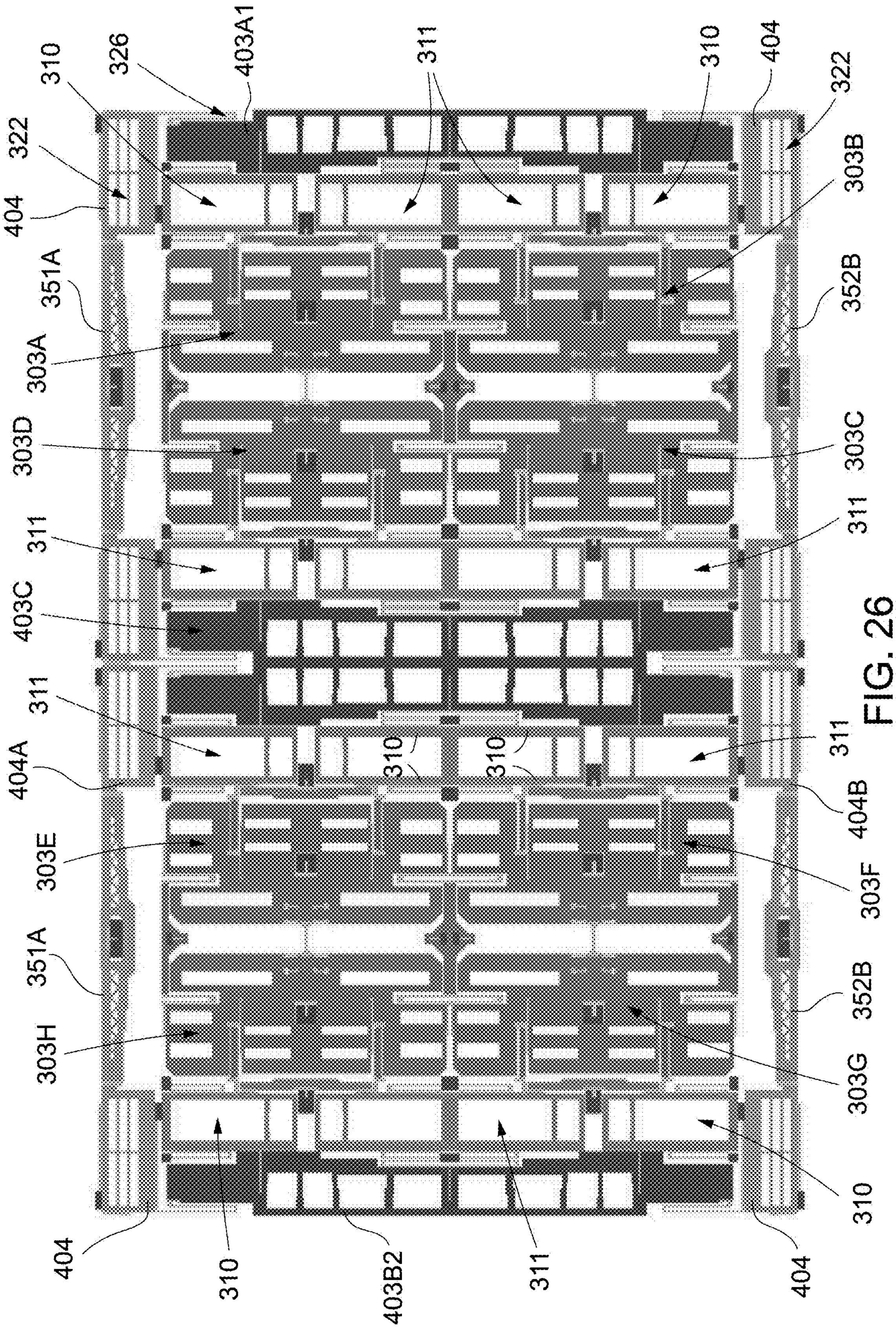
FIG. 26 shows a possible implementation of the gyroscope of FIGS. 24 and 25.

The movement of the yaw sense masses 404 may be sensed through position sense structures 322 associated therewith, schematically represented in FIG. 25 (see also FIG. 26).

In presence of a roll movement, each roll sense mass 303 rotates around the respective barycentric sense axes S1 (shown in FIG. 25 for the roll sense mass 303A).

Due to the opposite drive direction of the roll sense masses 303 due to the drive assemblies 310, 311, they rotate in opposite directions, for example as represented by the cross symbols (moving towards the support 113 and away from an observer) and by the dot symbols (moving away from the support 113 and towards the observer).

In this sense mode, the second bridge elements 352A, 352B and the central bridge element 352C rotate around axes parallel to the second horizontal axis Y and passing through the respective second and third bridge anchors 357, 358, following the opposite movement of the coupled portions of the pairs of roll sense masses 303 (adjacent along the first horizontal axis X) and the concordant movement of the coupled portions of the roll sense masses 303 adjacent along the second horizontal axis Y, similarly to what has been described above with reference to FIG. 23B.

The gyroscope 350 of FIG. 25 is based on the structure shown and described in FIGS. 14D-14G. In fact, as to the yaw sense structures, the Coriolis masses 403A1, 403C and 403B2 are equivalent respectively to the movable masses M1, M2-3 and M4 of FIGS. 14D and 14E and are driven by the drive assemblies 310, 311 so that, along the first horizontal axis X, the Coriolis masses 403A1, 403B2 farther from the central axis B4 move in a same direction to each other and in an opposite direction with respect to the Coriolis masses close to the central axis B4 (central Coriolis mass 403C), as shown by the arrows in FIG. 25. The same applies to the sense mode, where Coriolis masses 403A1, 403B2 have movements (along the second horizontal axis Y) directed in a mutually concordant direction and opposite with respect to the central movable mass 403C, as shown by the arrows in FIG. 26.

Conversely, linear vibrations, which act on the gyroscope 350, tend to cause all the Coriolis masses 403A-403C (and the yaw sense masses 404 integral therewith in sense mode) to vibrate in the same direction (positive or negative direction along the second horizontal axis Y). Here, the first bridge elements 351A, 351B prevent this spurious movement; furthermore, since possible residual movements have different directions with respect to the sense movements in some yaw sense masses 404, any residual vibrations may be canceled by the sensed signals.

Furthermore, the pairs of Coriolis masses 403A-403C (and the yaw sense masses 404 integral therewith in sense mode) are also resistant to rotational vibrations, because these would tend to cause the Coriolis masses 403A1, 403B2 that are farther from the central axis B4 (as well as each half of the central Coriolis mass 403C) to move in opposite directions around the barycenter Cl of the gyroscope 350, rotation that is prevented by the geometry and in any case would give rise to signals different from yaw sense signals and therefore cancellable.

The same applies to the roll sense portion.

Here the configuration and connection of the drive assemblies 310, 311 and of the roll sense masses 303 coupled along the second horizontal axis Y (four half-masses, also indicated in FIG. 24 as 303A1, 303A2, 303B1, 303B2, joined two by two to form, for example, the roll sense masses 303A and 303B) corresponds to what has been described above with reference to FIGS. 14F and 14G and therefore also the roll sense portion is resistant to both linear and rotational vibrations. According to another possible identification, the movable masses M1-M4 of FIGS. 14F and 14G correspond to the pairs of roll sense masses 303A-303B, 303C-303D, 303E-303F and 303G-303H.

A possible implementation of the gyroscope 350 of FIGS. 22-25 is shown in FIG. 26.

The gyroscope described here is therefore particularly robust, has balanced driving and is insensitive to linear and/or rotational accelerations.

In particular, in the minimum structure (elementary structures of FIGS. 1-4, 14B-14C, 16-18 and 23A, 23B), it is insensitive to spurious linear vibrations, while in the configurations described with reference to FIGS. 14D-14G, 15, 19-21, 22, 24-26 it is resistant to both linear and rotational spurious vibrations.

The Coriolis force applied to the drive masses cannot generate torques able to cause spurious movements; therefore the drive motion cannot be forced by external accelerations.

As discussed above, the sense movements (yaw and/or pitch and/or roll movements) are insensitive to external linear or angular accelerations and cannot be forced thereby.

The structures may be provided in a compact manner and therefore at reduced costs; in particular, the biaxial solutions allow sensing of external rotational fields acting around different rotation axes with a small structure, capable of providing even redundant signals (for example usable as described with reference to FIGS. 10-13), also simplifying the signal processing by an associated ASIC.

Finally, it is clear that modifications and variations may be made to the gyroscope described and illustrated herein without thereby departing from the scope of the present disclosure. For example, the different embodiments described may be combined to provide further solutions.

A MEMS gyroscope (1; 50; 100; 150; 200; 250; 300; 350) may be summarized as including: a fixed structure (13; 113; 213; 313); a first movable mass (18; 118; 218; M1; 303, 403A; 303A1; 403A1), the first movable mass being configured to move with respect to the fixed structure along a first drive direction and along a first sense direction, transverse to the first drive direction; a first drive assembly (10; 110; 210; 310), coupled to the first movable mass and configured to generate a first alternate drive movement in the first drive direction; a first drive elastic structure (20; 120; 220, 323, 320), coupled to the first movable mass and to the first drive assembly, the first drive elastic structure being rigid in the first drive direction, being configured to transfer the first alternate drive movement to the first movable mass and being compliant in the first sense direction; a second movable mass (19; 119; 219; M2; 303, 403B; 303A2, 403B1), the second movable mass being configured to move with respect to the fixed structure in a second drive direction parallel to the first drive direction and in a second sense direction parallel to the first sense direction; a second drive assembly (11; 111; 211; 311), coupled to the second movable mass and configured to generate a second alternate drive movement in the second drive direction, the second alternate drive movement being in phase opposition with respect to the first alternate drive movement; and a second drive elastic structure (20; 120; 220; 320, 323), coupled to the second movable mass and to the second drive assembly, the second drive elastic structure being rigid in the second drive direction, configured to transfer the second alternate drive movement to the second movable mass and compliant in the second sense direction.

The MEMS gyroscope may further include: a first sense elastic system (4, 25; 104, 125; 204, 225; 404, 325, 326; 352A, 352B, 357, 327), coupling the first movable mass (18; 118; 218; M1; 303, 403A; 303A1; 403A1) to the fixed structure (13; 113; 213; 313) and configured to allow movements of the first movable mass with respect to the fixed structure in the first drive direction and in the first sense direction; a second sense elastic system (4, 25; 104, 125; 204, 225; 404, 325, 326; 352A, 352B, 357, 327), coupling the second movable mass (19; 119; 219; M2; 303, 403; 303A2, 403B1) to the fixed structure and configured to allow movements of the second movable mass with respect to the fixed structure in the second drive direction and in the second sense direction.

The first sense elastic system may include a first sense mass (4; 104; 204, 204A; 404), a first sense elastic structure (26; 126; 226; 326) and a first anchoring elastic structure (25; 125; 225; 327), the first sense elastic structure (26; 126; 226; 326) being coupled between the first movable mass (18; 118; 218, 218A; M1; 303, 403; 303A1; 403A1) and the first sense mass (4; 104; 204, 204A; 404), compliant in the first drive direction and rigid in the first sense direction, the first anchoring elastic structure (25; 125; 225; 325) being coupled between the first sense mass and the fixed structure (13; 113; 213; 313) and compliant in the first sense direction; the second sense elastic system may include a second sense mass (4; 104; 204, 204A; 404), a second sense elastic structure (26; 126; 226; 326) and a second anchoring elastic structure (25; 125; 225; 327), the second sense elastic structure (26; 126; 226; 326) being coupled between the second movable mass (19; 119; 219, 219B; M2; 303, 403; 303B1; 403B1) and the second sense mass (4; 104; 204; 404), compliant in the second drive direction and rigid in the second sense direction, the second anchoring elastic structure (25; 125; 225; 325) being coupled between the second sense mass and the fixed structure and compliant in the second sense direction; and the first sense mass and the second sense mass may be coupled to respective position sense structures (22; 122; 222; 230; 322).

The MEMS gyroscope may further include: a third movable mass (M3; 219, 219A; 303, 403; 303B1, 403A2), the third movable mass being configured to move with respect to the fixed structure (13; 113; 213; 313) in a third drive direction, parallel to the first drive direction, and in a third sense direction, parallel to the first sense direction; a third drive assembly (211; 311), coupled to the third movable mass and configured to generate a third alternate drive movement in the third drive direction, the third alternate drive movement in phase with the second alternate drive movement; a third drive elastic structure (220, 323, 320), coupled to the third movable mass and to the third drive assembly, the third drive elastic structure rigid in the third drive direction, configured to transfer the third alternate drive movement to the third movable mass and compliant in the third sense direction; a fourth movable mass (M4; 218, 218B; 303, 403; 303B2, 403B2), the fourth movable mass configured to move with respect to the fixed structure in a fourth drive direction, parallel to the first drive direction, and in a fourth sense direction, parallel to the first sense direction; a fourth drive assembly (210; 310), coupled to the fourth movable mass and configured to generate a fourth alternate drive movement in the fourth drive direction, the fourth alternate drive movement in phase with the first alternate drive movement; and a fourth drive elastic structure (220, 323, 320), coupled to the fourth movable mass and the fourth drive assembly, the fourth drive elastic structure rigid in the fourth drive direction, configured to transfer the fourth alternate drive movement to the fourth movable mass and compliant in the fourth sense direction.

The MEMS gyroscope may further include: a third sense elastic system (204, 225; 303; 404, 325, 326, 327, 352C) coupling the third movable mass (M3; 219, 219A; 303, 403; 303B1, 403A2) to the fixed structure (213; 313) and configured to allow movements of the third movable mass with respect to the fixed structure in the third drive direction and in the third sense direction; and a fourth sense elastic system (204, 225; 303, 325, 326, 327, 352C), coupling the fourth movable mass (M4; 218, 218B; 303, 403; 303B2, 403B2) to the fixed structure and configured to allow movements of the fourth movable mass with respect to the fixed structure in the fourth drive direction and in the fourth sense direction.

The third sense elastic system may include a third sense mass (204, 204B; 404), a third sense elastic structure (226; 326) and a third anchoring elastic structure (225; 327), the third sense elastic structure (226; 326) coupled between the third movable mass (M3; 219B; 403; 403A2) and the third sense mass, compliant in the third drive direction and rigid in the third sense direction, the third anchoring elastic structure (225; 327) coupled between the third sense mass and the fixed structure and compliant in the third sense direction; the fourth sense elastic system may include a fourth sense mass (204, 204B; 404), a fourth sense elastic structure (226; 326) and a fourth anchoring elastic structure (225; 327), the fourth sense elastic structure (226; 326) coupled between the fourth movable mass (M4; 218, 218B; 403; 403B2) and the fourth sense mass, compliant in the fourth drive direction and rigid in the fourth sense direction, the fourth anchoring elastic structure (225; 327) coupled between the fourth sense mass and the fixed structure and compliant in the fourth sense direction; and the third sense mass and the fourth sense mass may be coupled to respective position sense structures (222; 230; 322).

The second movable mass (219A; 403B1) and the third movable mass (219B; 403A1) may be joined and monolithic to each other, or the first and the second movable masses (303; 303A1, 303A2) may be joined and monolithic to each other and the third and the fourth movable masses (303; 303B1, 303B2) may be joined and monolithic to each other.

The MEMS gyroscope may further include a first bridge element (351A, 351B), coupling the first and the second sense masses (404, 404A, 404B), the first bridge element (351A, 351B) coupled to the fixed structure (313) and rotatable around a first vertical axis transverse to the first drive direction and to the first sense direction.

The first and the second movable masses (18, 19; 218, 218A, 219, 219A; 403A, 403B; 403A1, 403B1; 403A1, 403B1) may be a yaw sense portion.

The first and the second movable masses (118, 119; 218, 218A, 219, 219A; 303A1, 303A2) may be a pitch/roll sense portion.

The MEMS gyroscope may further include a pitch/roll sense portion, the pitch/roll sense portion including: a fifth movable mass (303A1), the fifth movable mass configured to move with respect to the fixed structure (13; 113; 213; 313) in a fifth drive direction, parallel to the first drive direction, and in a fifth sense direction, transverse to the fifth drive direction and to the first sense direction; a fifth drive elastic structure (323), coupled to the fifth movable mass and to the first drive assembly (310), the fifth drive elastic structure rigid in the fifth drive direction, configured to transfer the first alternate drive movement to the fifth movable mass and compliant in the fifth sense direction; a sixth movable mass (303A2), the sixth movable mass configured to move with respect to the fixed structure in a sixth drive direction, parallel to the first drive direction, and in a sixth sense direction, parallel to the fifth sense direction; a fifth drive assembly (311), coupled to the sixth movable mass and configured to generate a fifth alternate drive movement in the sixth drive direction, the fifth alternate drive movement in phase opposition with the first alternate drive movement; and a sixth drive elastic structure (323), coupled to the sixth movable mass and the fifth drive assembly (311), the sixth drive elastic structure rigid in the sixth drive direction, configured to transfer the fifth alternate drive movement to the sixth movable mass and compliant in the sixth sense direction.

The pitch/roll sense portion may further include: a seventh movable mass (303B1), the seventh movable mass configured to move with respect to the fixed structure (13; 113; 213; 313) in a seventh drive direction, parallel to the first drive direction, and in a seventh sense direction, parallel to the fifth sense direction; a sixth drive assembly (311), coupled to the seventh movable mass and configured to generate a sixth alternate drive movement in the seventh drive direction, the sixth alternate drive movement in phase with the first alternate drive movement; a seventh drive elastic structure (323), coupled to the seventh movable mass and to the sixth drive assembly (310), the seventh drive elastic structure rigid in the seventh drive direction, configured to transfer the sixth alternate drive movement to the seventh movable mass and compliant in the seventh sense direction; an eighth movable mass (303B2), the eighth movable mass configured to move with respect to the fixed structure in an eighth drive direction, parallel to the first drive direction, and in an eighth sense direction, parallel to the fifth sense direction; a seventh drive assembly (310), coupled to the eighth movable mass and configured to generate a seventh alternate drive movement in the eighth drive direction, the seventh alternate drive movement in phase with the first alternate drive movement; and an eighth drive elastic structure (323), coupled to the eighth movable mass and the seventh drive assembly, the eighth drive elastic structure rigid in the eighth drive direction, configured to transfer the seventh alternate drive movement to the eighth movable mass and compliant in the eighth sense direction.

The fifth and the sixth movable mass (303A1, 303A2) may be joined to each other and monolithic, and the seventh and the eighth movable masses (303B1, 303B2) may be joined to each other and monolithic.

The MEMS gyroscope may further include a fifth anchoring elastic structure (352C) elastically coupling the fifth, the sixth, the seventh and the eighth movable masses.

The MEMS gyroscope may further include: a ninth movable mass (303D), the ninth movable mass configured to move with respect to the fixed structure (13; 113; 213; 313) in a ninth drive direction, parallel to the first drive direction, and in a ninth sense direction, parallel to the fifth movement direction; a ninth drive elastic structure (323), coupled to the ninth movable mass and the second drive assembly (311), the ninth drive elastic structure rigid in the second drive direction, configured to transfer the second alternate drive movement to the ninth movable mass and compliant in the ninth sense direction; and a second bridge element (352A) extending between the fifth (303A1), the sixth (303B1) and the ninth (303D) movable masses, the second bridge element coupled to the fixed structure (313) and rotatable around a second vertical axis, transverse to the first drive direction and parallel to the fifth sense direction.

A method for driving a MEMS gyroscope, the MEMS gyroscope may be summarized as including: a fixed structure (13; 113; 213; 313); a first movable mass (18; 118; 218; M1; 303, 403A; 303A1; 403A1) configured to move with respect to the fixed structure along a first drive direction and along a first sense direction, transverse to the first drive direction; a first drive assembly (10; 110; 210; 310), coupled to the first movable mass; a first drive elastic structure (20; 120; 220, 323, 320), coupled to the first movable mass and to the first drive assembly, the first drive elastic structure rigid in the first drive direction and compliant in the first sense direction; a second movable mass (19; 119; 219; 303, 403B; 303A2, 403B1), the second movable mass configured to move with respect to the fixed structure in a second drive direction parallel to the first drive direction and in a second sense direction parallel to the first sense direction; a second drive assembly (11; 111; 211; 311), coupled to the second movable mass; and a second drive elastic structure (20), coupled to the second movable mass and to the second drive assembly, the second drive elastic structure rigid in the second drive direction and compliant in the second sense direction, the method may be summarized as including: generating a first alternate drive movement of the first drive assembly in the first drive direction; transferring the first alternate drive movement from the first drive assembly to the first movable mass; generating a second alternate drive movement of the second drive assembly in the second drive direction, the second alternate drive movement in phase opposition with respect to the first alternate drive movement; and transferring the second alternate drive movement from the second drive assembly to the second movable mass.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A micro electro-mechanical systems (MEMS) gyroscope, comprising:
- a fixed structure;
- a first movable mass, the first movable mass being configured to move with respect to the fixed structure along a first drive direction and along a first sense direction, transverse to the first drive direction;
- a first drive assembly, coupled to the first movable mass and configured to generate a first alternate drive movement in the first drive direction;
- a first drive elastic structure, coupled to the first movable mass and to the first drive assembly, the first drive elastic structure being rigid in the first drive direction, being configured to transfer the first alternate drive movement to the first movable mass and being compliant in the first sense direction;
- a second movable mass, the second movable mass being configured to move with respect to the fixed structure in a second drive direction parallel to the first drive direction and in a second sense direction parallel to the first sense direction;
- a second drive assembly, coupled to the second movable mass and configured to generate a second alternate drive movement in the second drive direction, the second alternate drive movement being in phase opposition with respect to the first alternate drive movement; and
- a second drive elastic structure, coupled to the second movable mass and to the second drive assembly, the second drive elastic structure being rigid in the second drive direction, configured to transfer the second alternate drive movement to the second movable mass and compliant in the second sense direction;
- a third movable mass, the third movable mass configured to move with respect to the fixed structure in a third drive direction, parallel to the first drive direction, and in a third sense direction, transverse to the third drive direction and to the first sense direction;
- a third drive elastic structure, coupled to the third movable mass and to the first drive assembly, the third drive elastic structure rigid in the third drive direction, configured to transfer the first alternate drive movement to the third movable mass and compliant in the third sense direction;
- a fourth movable mass, the fourth movable mass configured to move with respect to the fixed structure in a fourth drive direction, parallel to the first drive direction, and in a fourth sense direction, parallel to the third sense direction;
- a third drive assembly, coupled to the fourth movable mass and configured to generate a fifth alternate drive movement in the fourth drive direction, the fifth alternate drive movement in phase opposition with the first alternate drive movement; and
- a fourth drive elastic structure, coupled to the fourth movable mass and the third drive assembly, the fourth drive elastic structure rigid in the fourth drive direction, configured to transfer the fifth alternate drive movement to the fourth movable mass and compliant in the fourth sense direction.

2. The MEMS gyroscope according to claim 1, further comprising:
- a first sense elastic system, coupling the first movable mass to the fixed structure and configured to allow movements of the first movable mass with respect to the fixed structure in the first drive direction and in the first sense direction;
- a second sense elastic system, coupling the second movable mass to the fixed structure and configured to allow movements of the second movable mass with respect to the fixed structure in the second drive direction and in the second sense direction.

3. The MEMS gyroscope according to claim 2, wherein:
- the first sense elastic system comprises a first sense mass, a first sense elastic structure and a first anchoring elastic structure, the first sense elastic structure being coupled between the first movable mass and the first sense mass, compliant in the first drive direction and rigid in the first sense direction, the first anchoring elastic structure being coupled between the first sense mass and the fixed structure and compliant in the first sense direction;
- the second sense elastic system comprises a second sense mass, a second sense elastic structure and a second anchoring elastic structure, the second sense elastic structure being coupled between the second movable mass and the second sense mass, compliant in the second drive direction and rigid in the second sense direction, the second anchoring elastic structure being coupled between the second sense mass and the fixed structure and compliant in the second sense direction; and
- the first sense mass and the second sense mass are coupled to respective position sense structures.

4. The MEMS gyroscope according to claim 3, further comprising:
- a first bridge element coupling the first and the second sense masses, the first bridge element coupled to the fixed structure and rotatable around a first vertical axis transverse to the first drive direction and to the first sense direction.

5. The MEMS gyroscope according to claim 1, wherein the first and the second movable masses are a yaw sense portion.

6. The MEMS gyroscope according to claim 5, wherein the third movable mass, the third drive elastic structure, the fourth movable mass, the third drive assembly, and the fourth drive elastic structure are a pitch/roll sense portion.

7. The MEMS gyroscope according to claim 6, wherein the pitch/roll sense portion further comprises:
- a fifth movable mass, the fifth movable mass configured to move with respect to the fixed structure in a fifth drive direction, parallel to the first drive direction, and in a fifth sense direction, parallel to the third sense direction;
- a fourth drive assembly, coupled to the fifth movable mass and configured to generate a sixth alternate drive movement in the fifth drive direction, the sixth alternate drive movement in phase with the first alternate drive movement;
- a fifth drive elastic structure, coupled to the fifth movable mass and to the fourth drive assembly, the fifth drive elastic structure rigid in the fifth drive direction, configured to transfer the sixth alternate drive movement to the fifth movable mass and compliant in the fifth sense direction;

an sixth movable mass, the sixth movable mass configured to move with respect to the fixed structure in an sixth drive direction, parallel to the first drive direction, and in an sixth sense direction, parallel to the third sense direction;

a fifth drive assembly, coupled to the sixth movable mass and configured to generate a seventh alternate drive movement in the sixth drive direction, the seventh alternate drive movement in phase with the first alternate drive movement; and an sixth drive elastic structure, coupled to the sixth movable mass and the fourth drive assembly, the sixth drive elastic structure rigid in the sixth drive direction, configured to transfer the seventh alternate drive movement to the sixth movable mass and compliant in the sixth sense direction.

8. The MEMS gyroscope according to claim 7, wherein the third and the fourth movable mass are joined to each other and monolithic and wherein the fifth and the sixth movable masses are joined to each other and monolithic.

9. The MEMS gyroscope according to claim 7, further comprising an anchoring elastic structure elastically coupling the third, the fourth, the fifth and the sixth movable masses.

10. The MEMS gyroscope according to claim 7, further comprising:

a seventh movable mass, the seventh movable mass configured to move with respect to the fixed structure in a seventh drive direction, parallel to the first drive direction, and in a seventh sense direction, parallel to the third sense direction;

a seventh drive elastic structure, coupled to the seventh movable mass and the second drive assembly, the seventh drive elastic structure rigid in the second drive direction, configured to transfer the second alternate drive movement to the seventh movable mass and compliant in the seventh sense direction; and a bridge element extending between the third, the fourth and the seventh movable masses, the bridge element coupled to the fixed structure and rotatable around a second vertical axis, transverse to the first drive direction and parallel to the third sense direction.

11. A gyroscope, comprising:

a support;

a first drive assembly elastically coupled to the support, the first drive assembly including a first frame including a base and first and second arms extending from the base of the first frame;

a first mass positioned between the first and second arms of the first frame, the first mass elastically coupled to the first arm of the first frame by a first spring and to the second arm of the first frame by a second spring, the first mass configured to move with respect to the support along a first drive direction and along a first sense direction that is transverse to the first drive direction;

a second drive assembly elastically coupled to the support, the second drive assembly including a second frame including a base and first and second arms extending from the base of the second frame;

a second mass positioned between the first and second arms of the second frame, the second mass elastically coupled to the first arm of the second frame by a third spring and to the second arm of the second frame by a fourth spring, the second mass configured to move with respect to the support in a second drive direction parallel to the first drive direction and in a second sense direction parallel to the first sense direction, the first arm of the first frame elastically coupled to the first arm of the second frame by a fifth spring, the second arm of the first frame elastically coupled to the second arm of the second frame by a sixth spring; and a sense mass elastically coupled to the support and elastically coupled between the first mass and the second mass.

12. The gyroscope of claim 11, wherein the sense mass is configured to rotate around a rotation axis.

13. A gyroscope, comprising:

a fixed structure;

a first movable mass configured to move along a first drive direction and along a first sense direction, transverse to the first drive direction;

a first drive assembly elastically coupled to the fixed structure and the first movable mass, the first drive assembly configured to generate a first alternate drive movement in the first drive direction, the first drive assembly including a first frame including a base and first and second arms extending from the base of the first frame, the first movable mass elastically coupled to the first arm of the first frame by a first spring and to the second arm of the first frame by a second spring;

a second movable mass configured to move in a second drive direction parallel to the first drive direction and in a second sense direction parallel to the first sense direction;

a second drive assembly elastically coupled to the fixed structure and the second movable mass, the second drive assembly configured to generate a second alternate drive movement in the second drive direction, the second drive assembly including a second frame including a base and first and second arms extending from the base of the second frame, the second movable mass elastically coupled to the first arm of the second frame by a third spring and to the second arm of the second frame by a fourth spring, the first arm of the first frame elastically coupled to the first arm of the second frame by a fifth spring, the second arm of the first frame elastically coupled to the second arm of the second frame by a sixth spring; and a sense mass elastically coupled to the fixed structure, the first movable mass, and the second movable mass, the first movable mass being coupled to the second movable mass by the sense mass.

* * * * *